(12) United States Patent
Kondo

(10) Patent No.: US 7,281,510 B2
(45) Date of Patent: Oct. 16, 2007

(54) APPARATUS FOR CONTROLLING ENGINE

(75) Inventor: Wakichi Kondo, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/529,479

(22) Filed: Sep. 29, 2006

(65) Prior Publication Data

US 2007/0017480 A1 Jan. 25, 2007

Related U.S. Application Data

(62) Division of application No. 11/356,192, filed on Feb. 17, 2006, now Pat. No. 7,207,306, which is a division of application No. 10/310,852, filed on Dec. 6, 2002, now abandoned.

(30) Foreign Application Priority Data

| Dec. 6, 2001 | (JP) | ............................... 2001-372259 |
| Dec. 14, 2001 | (JP) | ............................... 2001-381015 |
| Dec. 18, 2001 | (JP) | ............................... 2001-383898 |
| Jan. 22, 2002 | (JP) | ............................... 2002-12924 |

(51) Int. Cl.
*F02N 17/00* (2006.01)
*F02N 11/08* (2006.01)

(52) U.S. Cl. ................. 123/179.5; 123/179.4

(58) Field of Classification Search ............. 123/179.3, 123/179.4, 179.5, 179.16, 179.18, 345, 346, 123/347, 348, 198 F, 198 D
See application file for complete search history.

(56) References Cited

U.S. PATENT DOCUMENTS 4,009,695 A   3/1977 Ule 4,466,392 A   8/1984 Uchida et al.
5,349,929 A   9/1994 Shimizu et al.
6,761,147 B2 *   7/2004 Majima ...................... 123/399

FOREIGN PATENT DOCUMENTS

| EP | 1 039 103 A2 | 3/2000 |
| JP | 06-081678 | 3/1994 |
| JP | 8-193531 | 7/1996 |
| JP | 10-047142 | 2/1998 |
| JP | 2000-34913 | 2/2000 |
| JP | 2000-213383 A | 8/2000 |
| JP | 2000-320356 | 11/2000 |
| JP | 2001-41072 | 2/2001 |
| JP | 2001-221072 A | 8/2001 |
| JP | 2001-221080 | 8/2001 |
| JP | 2001-271683 | 10/2001 |
| JP | 2001-304005 | 10/2001 |

* cited by examiner

*Primary Examiner*—Stephen K. Cronin
*Assistant Examiner*—Arnold Castro
(74) *Attorney, Agent, or Firm*—Nixon & Vanderhye P.C.

(57) ABSTRACT

An engine has variable-valve mechanisms. An engine control system has an engine control unit for executing automatic stop and start control. At an automatic-stop, the variable-valve mechanisms are controlled to obtain a valve operation characteristic suitable for a restart of the engine. When a catalyst is in an inactivated state, the variable-valve mechanisms are controlled to reduce the amount of residual gas leaking out from cylinders. At an automatic-start, the control of the variable-valve mechanism is prohibited and an intake air is adjusted by using a throttle valve. At an automatic-stop, the engine speed is abruptly reduced so that the engine speed passes through a resonant revolution speed area in a short period of time. When the voltage of a battery is low, the control of the variable-valve mechanism may be prohibited.

3 Claims, 21 Drawing Sheets

APPARATUS FOR CONTROLLING ENGINE

This application is a division of application Ser. No. 11/356,192, filed Feb. 17, 2006 now U.S. Pat No. 7,207,306, which is a division of application Ser. No. 10/310,852, filed Dec. 6, 2002 now abandoned, the entire contents of which are hereby incorporated by reference in this application.

CROSS REFERENCE TO RELATED APPLICATION

This application is based on Japanese Patent Applications No. 2001-372259 filed on Dec. 6, 2001, No. 2001-381015 filed on Dec. 14, 2001, No. 2001-383898 filed on Dec. 18, 2001 and No. 2002-12924 filed on Jan. 22, 2002 the contents of which are incorporated herein by reference.

BACKGROUND OF THE INVENTION

1. Field of the Invention

The present invention relates to an apparatus for controlling an internal combustion engine, which is also referred to hereafter simply as an engine. More particularly, the present invention relates to an apparatus for controlling an engine having a variable-valve mechanism.

2. Related Art

In the conventional engine, a throttle valve is provided on an intake pipe of the engine. The throttle valve adjusts the opening thereof in order to control an intake airflow. The driver depresses an accelerator pedal connected to the throttle valve by an electrical link mechanism so that the valve operates in accordance with a pedal-depression quantity. In addition, the throttle valve can also be controlled by an electrical control unit and a motor. The control of intake airflow executed by using the throttle valve is referred to as the throttle-valve control. Since a volume exists between the throttle valve and a cylinder, a response to a control command in the control of the intake airflow lags behind the command. In addition, a negative pressure is built up the downstream of the throttle valve. For this reason, a relatively large pumping loss is incurred.

The engine also has an intake valve and an exhaust valve. The intake valve and the exhaust valve are driven by a valve-driving mechanism such as a cam or by an electrical actuator. Operating characteristics of al least one of the intake valve and the exhaust valve are prescribed in terms of its attributes such as an opening timing, a closing timing, a valve opening, a valve lift quantity and a lift-quantity waveform. There is known a variable-valve mechanism for varying the operation characteristics of the valves. For example, there is a variable-valve mechanism for adjusting the opening and the closing timings in an advance or retard direction. Another example is a variable-valve mechanism for adjusting the opening of the valve to a value between a zero and a maximum. Another typical variable-valve mechanism adjusts the operation characteristics with a high degree of freedom. In an engine having such a variable-valve mechanism, the intake airflow can be adjusted by using the variable-valve mechanism. The control of intake airflow executed by the variable-valve mechanism is referred to as variable-valve control. Typically, the operation characteristics of the valve are adjusted in accordance with an acceleration operation quantity and the operating state of the engine. The variable-valve control generates a small response lag in comparison with the throttle-valve control. In addition, in the case of the variable-valve control, the magnitude of an incurred pumping loss can be reduced. For example, by execution of variable-valve control, the throttle valve can be opened relatively. In a typical engine, the execution of variable-valve control makes it unnecessary to install a throttle valve.

JP-A-8-193531 discloses an apparatus for automatically stopping the engine temporarily. Such an apparatus is referred to as an automatic stop and start apparatus or an idling stop control apparatus. Control executed by the apparatus is known as automatic stop and start control. When the vehicle is halted, for example, the engine is automatically stopped without the need for an operation to be carried out by the driver. Such control is referred to as automatic stop control. When the driver makes an attempt to drive the vehicle after the automatic stop control, the engine is automatically started. In response to an operation carried out by the driver to depress the accelerator pedal, for example, a start motor is automatically activated to start the engine automatically. The start motor can also be automatically activated to start the engine when the driver carries out an operation to release the brake pedal. Such control is referred to as automatic start control or automatic restart control. The automatic stop and start control is a means capable for effectively reducing the fuel consumption, exhaust emissions and noises.

By execution of the automatic stop and start control, on the other hand, a transient state such as the start or stop of the engine occurs very frequently. For this reason, there is demanded proper control of the engine also in the transient state such as the start or stop of the engine.

Assume for example that, in automatic stop control, a valve operation characteristic prior to the automatic stop control is saved. In this case, in the next automatic start control based on the saved valve operation characteristic, it is feared that a smooth start of the engine is obstructed.

As another example, assume that the lift quantity of the exhaust valve is set at a large value in automatic stop control. In this case, residual gas left in the engine flows out from the cylinder to the exhaust pipe when the engine is halted temporarily. In particular, in an inactivated state of a catalyst for cleaning exhaust gas, the state of the exhaust emissions is worsened.

For example, the intake change of intake airflow resulting from the variable-valve control can be detected by an intake-air-flow sensor or an intake-airflow meter only after a fixed delay. Right after the engine has been automatically started, on the other hand, the operating state of the engine changes abruptly. Thus, there is a case in which, by execution of the variable-valve control, the intake airflow cannot be adjusted properly. As a result, a torque shock is generated. In addition, a change in air-fuel ratio is resulted in.

In a process wherein the engine speed becomes lower than an idle speed due to the automatic stop control, for example, the engine speed temporarily matches the characteristic frequency of the engine itself or the characteristic frequency of the driving system of the vehicle. As a result, resonance occurs, temporarily increasing the amplitude of vibration and the magnitude of noise.

In the automatic stop control, for example, a starter is used frequently. As a result, there appears a tendency to reduction of the battery voltage. In particular, the voltage of the battery decreases at an automatic-start time. When the voltage of the battery decreases, the variable-valve mechanism does not operate in a stable manner in some cases. When the voltage of the battery decreases, for example, it is quite within the bounds of possibility that the operation characteristic of the valve cannot be controlled to follow a target operation characteristic. As a result, it is feared that the exhaust emissions deteriorate.

SUMMARY OF THE INVENTION

It is thus an object of the present invention to provide a control apparatus, which is capable of properly controlling an engine having a variable-valve mechanism when the engine is automatically stopped.

It is another object of the present invention to provide a control apparatus, which is capable of properly controlling an engine having a variable-valve mechanism when the engine is automatically started.

It is a further object of the present invention to provide a control apparatus, which is capable of smoothly starting an engine having a variable-valve mechanism when the engine is automatically started.

It is a still further object of the present invention to provide a control apparatus, which is capable of reducing emissions exhausted from an engine having a variable-valve mechanism right after the engine is stopped.

It is a still further object of the present invention to provide a control apparatus, which is capable of controlling the intake airflow of an engine having a variable-valve mechanism in a stable manner right after the engine is automatically stopped.

It is a still further object of the present invention to provide a control apparatus, which is capable of suppressing uncomfortable vibration caused by a low speed of an engine having a variable-valve mechanism right after the engine is stopped.

It is a still further object of the present invention to provide a control apparatus, which is capable of controlling the intake airflow of an engine having a variable-valve mechanism in a stable manner in automatic start control.

In accordance with a first aspect of the present invention, right after an automatic stop control means automatically stops the engine, an automatic stop valve control means computes a target valve operation characteristic on the basis of the present state of the engine and/or the present state of the vehicle, and controls a valve operation characteristic to the target valve operation characteristic for an automatic-stop time.

An automatic-stop time is defined as a time between an automatic stop of the engine and an automatic start of the engine. In general, the automatic-stop time such as a time of waiting for a traffic light to turn to a green color is relatively short in many cases. Thus, while the engine is in an automatically stopped state, the state of the engine and/or the state of the vehicle such as the temperature of the cooling water do not change much in many cases. Accordingly, it is possible to find a valve operation characteristic in which the state of the engine and/or the state of the vehicle at an automatic start of the engine after an automatic stop of the engine are the same as the state of the engine and/or the state of the vehicle right after the automatic stop so that the state of the engine and/or the state of the vehicle right after the automatic stop can be applied to the automatic start after the automatic stop.

Thus, right after the engine is automatically stopped, it is possible to find a valve operation characteristic, which is presumed to be proper for an automatic start after the automatic stop from the present state of the engine and/or the present state of the vehicle right after the automatic stop, as a target valve operation characteristic, and control the valve operation characteristic to the target valve operation characteristic while the engine is in an automatically stopped state. At the next automatic-start time, the engine can be automatically started under a valve operation characteristic approximately proper for an automatic start so that an automatic-start characteristic of the engine can be improved and exhaust emissions at the automatic-start time can be reduced.

By the way, if an exhaust valve of any cylinder is largely opened in an automatically stopped state of the engine, resulting in a state in which residual gas remaining in the cylinder leaks out to an exhaust pipe with ease, it is quite within the bounds of possibility that the residual gas leaking out from the cylinder is discharged to the atmosphere without being cleaned by a catalyst provided on the exhaust pipe as a means for cleaning exhaust gas provided that the catalyst is in a pre-warmed state or an inactivated state.

In order to solve the above problem, if the catalyst is presumed to be in a state of being warmed or activated insufficiently on the basis of the present state of the engine and/or the present state of the vehicle, which is detected right after the engine is stopped automatically, a valve operation characteristic making residual gas left in a cylinder difficult to leak out is found and set as a target valve operation characteristic for an automatic-stop time. An example of such a condition is a condition in which the lift quantity of the valve is 0 or a minimum. If the catalyst is presumed to be in a state of being warmed or activated insufficiently, the engine can be stopped into an automatic stopped state by using a valve operation characteristic making residual gas left in a cylinder difficult to leak out as a target valve operation characteristic for the automatic stop. Thus, exhaust emissions can be reduced during an automatic stop.

When an automatic start control means automatically starts the engine, an automatic start valve control means computes a target valve operation characteristic on the basis of the present state of the engine and/or the present state of the vehicle, and controls a valve operation characteristic to the target valve operation characteristic for an automatic start time. When the engine is automatically started, a target valve operation characteristic optimum for an automatic start is found on the basis of the present state of the engine and/or the present state of the vehicle, and used as a target valve operation characteristic when the engine is automatically started. Thus, at an automatic-start time of the engine, the engine can be automatically started under a target valve operation characteristic optimum for an automatic start. As a result, an automatic-start characteristic of the engine can be improved and exhaust emissions at the automatic-start time can be reduced.

Right after an automatic stop of the engine, a target valve operation characteristic for an automatic-stop time is found on the basis of the present state of the engine and/or the present state of the vehicle, and the valve operation characteristic is controlled to the target valve operation characteristic for the automatic-stop time. In addition, a target valve operation characteristic for an automatic-start time is found on the basis of the present state of the engine and/or the present state of the vehicle, and the valve operation characteristic is controlled to the target valve operation characteristic for the automatic-start time.

In this configuration, right after an automatic stop of the engine, a target valve operation characteristic for an automatic-stop time is found on the basis of the present state of the engine and/or the present state of the vehicle, and the valve operation characteristic is controlled in advance for the time being to the target valve operation characteristic for the automatic-stop time. In addition, a target valve operation characteristic for an automatic-start time is found on the basis of the present state of the engine and/or the present state of the vehicle, and the valve operation characteristic is controlled to the target valve operation characteristic for the automatic-start time. When the engine is automatically started, the magnitude of correction of the valve operation characteristic can be reduced so that the valve operation characteristic can be corrected to a valve operation characteristic optimum for an automatic start in a short period of time. In addition, even if the valve operation characteristic set during the automatic stop is inevitably shifted from the valve operation characteristic optimum for the current automatic start due to a large change in engine state and/or a change in vehicle state during the automatic stop, the valve operation characteristic can be corrected to a valve operation characteristic optimum for an automatic start at an automatic-start time.

It is to be noted that, if the catalyst is presumed to be in a state of being warmed or activated insufficiently on the basis of the state of the engine and/or the state of the vehicle right after an automatic stop of the engine, right after the automatic stop of the engine, first of all, the valve operation characteristic is controlled in advance to a valve operation characteristic making residual gas left in a cylinder difficult to leak out and, then, when the engine is automatically started, the valve operation characteristic can be corrected to a valve operation characteristic optimum for an automatic start. An automatic-start characteristic of the engine can be improved and, at the same time, exhaust emissions at the automatic stop of the engine can be reduced.

By the way, in general, the lower the temperature of the engine and/or the lower the temperature of the battery mounted on the vehicle, the poorer the performance of the battery. The poorer the performance of the battery, the smaller the driving power of a starter. The smaller the driving power of a starter, the lower the flowability of the engine oil. The lower the flowability of the engine oil, the greater the frictions among movable parts. Thus, the cranking of the automatic-start time is prone to variations and the automatic-start characteristic of the engine tends to deteriorate. In addition, the number of automatic stops or the number of automatic starts increases and the automatic-stop time is lengthened so that the consumption of the battery power during an automatic stop rises. With the increased consumption of the battery power during an automatic stop, the start power decreases due to the consumption of power from the battery, and the automatic-start characteristic of the engine tends to deteriorate.

A target valve operation characteristic for an automatic-stop time can be found on the basis of at least one of an automatic-stop count (or the number of previous automatic stops or the number of automatic stops carried out so far, a cooling-water temperature, an intake-air temperature, an oil temperature and pieces of information having correlations with the automatic-stop count, the cooling-water temperature, the intake-air temperature and the oil temperature. By the automatic-stop count, the number of previous automatic stops or the number of automatic stops carried out so far is meant. As an alternative, a target valve operation characteristic for an automatic-start time is found on the basis of at least one of an automatic-stop count, an automatic-stop time, a cooling-water temperature, an intake-air temperature, an oil temperature and pieces of information having correlations with the automatic-stop count, the automatic-stop time, the cooling-water temperature, the intake-air temperature and the oil temperature. If a target valve operation characteristic for an automatic-stop time and/or a target valve operation characteristic for an automatic-start time are found using at least one of information for determining a warming state of the engine (that is, temperatures of the engine such as a cooling-water temperature, an intake-air temperature and an oil temperature) and information for determining the performance of the battery such as the automatic-stop count and the automatic-stop time, the valve operation characteristic can be controlled in a direction of stabilizing the cranking of the engine occurring at an automatic-start time in order to cope with a state of easy-to-occur cranking variations caused by a reduced driving power of the starter and increased frictions among movable components. As a result, the automatic-start characteristic of the engine can be further improved. The reduced driving power of the starter is attributed to the deterioration of performance of battery occurring at a low temperature of the engine and/or a low temperature of the battery. An example of the direction of stabilizing the cranking of the engine is a direction of increasing the intake airflow.

When an engine stall occurs due to a failure of an automatic start of the engine, the valve operation characteristic can be controlled in a direction of increasing the intake airflow prior to a restart of the engine. In an operation to start the engine, the engine can be restarted with an intake airflow greater than the valve operation characteristic for an engine-stall state after the engine stall due to a failure of an automatic start of the engine. Thus, the engine stall is prevented from being generated several times consecutively. As a result, the engine can be restarted successfully at an early time.

In accordance with a second aspect of the present invention, a variable-valve control prohibition means fixes the valve operation characteristic at a predetermined valve operation characteristic during a predetermined period after an automatic start of the engine, and a throttle-valve control means controls the opening of a throttle valve provided on the intake pipe of the engine in order to adjust the intake airflow. The predetermined period is referred to hereafter as a variable-valve control prohibit period.

In this configuration, during the variable-valve control prohibit period, that is, during a period including complicated and much variable transient times following an automatic start of the engine, the valve operation characteristic is fixed and the variable-valve control for adjusting the intake airflow is prohibited. Instead, throttle-valve control is executed to adjust the intake airflow. In comparison with the variable-valve control, the throttle-valve control exhibits a small delay of detection of an intake airflow at a transient time. Thus, during a period of an unstable operating state following an automatic start of the engine, the throttle-valve control is executed to stabilize the intake airflow so that it is possible to prevent the drivability following an automatic start of the engine and exhaust emissions following the automatic start of the engine from deteriorating.

In this case, if a difference between a target valve operation characteristic set initially at an automatic start of the engine and a valve operation characteristic fixed during the variable-valve control prohibit period following the completion of the automatic start of the engine is large, the valve operation characteristic prior to the completion of the automatic start of the engine greatly changes in an abrupt manner to a valve operation characteristic after the completion of the automatic start of the engine so that it is quite within the bounds of possibility that the abrupt change in valve operation characteristic appears as a torque shock and/or a deterioration of exhaust emissions.

In order to solve the above problem, during the variable-valve control prohibit period following the completion of the automatic start of the engine, the valve operation characteristic is fixed at a target valve operation characteristic for an automatic-start time of the engine. Since the valve operation characteristic is sustained and fixed prior to and after the completion of the automatic start of the engine, variations in valve operation characteristic can be eliminated. Thus, a torque shock and/or deterioration of exhaust emissions can be prevented from occurring due to an abrupt change in valve operation characteristic.

In addition, while the variable-valve control prohibit period following the automatic start of the engine can be set at a fixed value determined in advance, the variable-valve control prohibit period following the automatic start of the engine can be set at a value dependent on the number of previous engine automatic stops or the number of previous engine automatic starts. If the number of previous engine automatic stops after a start of a vehicle run or the number of previous engine automatic starts after the start of the vehicle run is small, the number of times an adverse effect is experienced can be determined to be small as well. Examples of the adverse effect are deteriorations caused by the variable-valve control such as a deterioration of the drivability and a deterioration of exhaust emissions. Since the number of times an adverse effect is experienced is small, the variable-valve control prohibit period can be shortened and the variable-valve control can thus be started at an early time after the automatic start of the engine. Thus, control to let the improvement of the performance take precedence of others can be executed. Typically, the performance such as fuel economy can be improved by execution of the variable-valve control. If the number of previous engine automatic stops after a start of a vehicle run or the number of previous engine automatic starts after the start of the vehicle run is large, on the other hand, the number of times an adverse effect is experienced can be determined to be large as well. In this case, the variable-valve control prohibit period is lengthened. Thus, control can be executed to let avoidance of the adverse effect caused by the variable-valve control take precedence of others rather than letting the improvement of the performance take precedence of others.

In accordance with a third aspect of the present invention, there is provided a variable-valve mechanism capable of controlling the intake airflow by varying valve operation characteristics of the intake valve or exhaust valve or both the valves of the engine. An intake airflow is controlled by adjusting the variable-valve mechanism and/or a throttle valve so as to gradually reduce a torque output by the engine and stop the engine when a predetermined condition for an automatic stop of the engine is satisfied during an operation of the engine. In addition, during the process to reduce the torque output by the engine, torque abrupt reduction control is executed to abruptly decrease the intake airflow by controlling the variable-valve mechanism so as to abruptly reduce the torque output by the engine with a timing with which the engine speed is about to pass through a predetermined speed zone. In this case, it is preferable to set the predetermined speed zone for execution of the torque abrupt reduction control to include a resonance speed area in which vibration of the engine is resonant with vibration of a vehicle-driving system.

Thus, when the engine is automatically stopped, if the variable-valve mechanism is controlled to abruptly decrease the intake airflow with a timing with which the engine speed is about to pass through the predetermined speed zone including the resonance speed area, the intake airflow into a cylinder abruptly decreases, exhibiting good responsiveness also with the timing with which the engine speed is about to pass through the predetermined speed zone. Thus, the engine speed can be reduced abruptly, passing through the predetermined speed zone including the resonance speed zone. As a result, at the time of the automatic stop control, the engine speed can be changed through the resonance speed zone in a short period of time so that noises and vibration, which are caused by the resonance phenomenon, can be reduced with a high degree of reliability without making the driver feel a sense of incompatibility.

In the case of a system having a variable-valve mechanism capable of controlling an intake valve to a completely closed state or a state with a valve lift quantity of 0, it is preferable to control the variable-valve mechanism to put the intake valve in the completely closed state at the time of the torque abrupt reduction control. At the time of the torque abrupt reduction control, it is possible to reduce the intake airflow into a cylinder to 0 instantaneously and, hence, to abruptly decrease the engine speed. Thus, the engine speed can be changed to pass through the resonance speed zone in a short period of time. As a result, noises and vibration, which are caused by the resonance phenomenon, can be reduced substantially.

In the case of a system having a variable-valve mechanism not capable of controlling an intake valve to a completely closed state, on the other hand, it is preferable to control the variable-valve mechanism to minimize the intake valve at the time of the torque abrupt reduction control and to control a throttle valve to a completely closed state. Even in the case of a system having a variable-valve mechanism not capable of controlling an intake valve to a completely closed state, both the variable-valve control and the throttle-valve control are effectively executed at the time of the torque abrupt reduction control to set the intake airflow at 0 quickly in order to reduce the engine speed abruptly. Thus, in the case of a variable-valve mechanism not capable of controlling an intake valve to a completely closed state, the engine speed can be changed to pass through the resonance speed zone in an extremely short period of time. As a result, noises and vibration, which are caused by the resonance phenomenon, can be reduced effectively.

In addition, injection of fuel can also be stopped at the time of the torque abrupt reduction control. Thus, the engine speed can be abruptly reduced with a high degree of effectiveness by reducing the intake airflow as well as stopping the injection of fuel at the time of the torque abrupt reduction control.

In addition, in a process to gradually reduce a torque output by the engine and stop the engine at the time of the automatic-stop control, the fuel injection volume can be controlled so as to maintain an air-fuel ratio at a target air-fuel ratio till the engine speed is reduced to a predetermined speed zone. The air-fuel ratio can be maintained at the target air-fuel ratio in a process to gradually reduce the torque output by the engine at the time of the automatic-stop control. Thus, it is possible to gradually reduce the engine speed without deteriorating exhaust emissions.

In accordance with a fourth aspect of the present invention, there is provided a variable-valve control prohibition means for prohibiting control executed by a variable-valve control means to open and close an intake valve and/or an exhaust valve on the basis of a battery voltage detected by a battery-voltage-driving means after the engine is automatically started by an automatic-start control means.

Thus, if the voltage of a battery decreases after the engine is automatically started so that the control response characteristics of the intake valve and/or the exhaust valve deteriorate, making it impossible to follow target valve lift quantities and follow valve opening/closing timings with a high degree of precision, the control of the intake valve and/or the exhaust valve is prohibited and, instead, the valve positions are fixed so as to stabilize a target intake airflow and, hence, suppress deteriorations of exhaust emissions.

In addition, it is preferable to have the variable-valve control prohibition means prohibit intake-air-flow control executed by using the intake valve and/or the exhaust valve till the voltage of the battery reaches a predetermined level.

In control of the intake airflow by varying a lift quantity variable through the use of electric power, in particular, the intake airflow at a location in close proximity to a combustion chamber of the engine can be adjusted. It is thus unnecessary to take a delay of an air system into consideration in comparison with the intake-air-flow control by using a throttle valve. As a result, the control of the intake airflow can be executed with a high degree of precision. When the voltage of the battery decreases, however, a response delay is incurred in the control of the intake valve and/or the exhaust valve so that the precision of the control of the intake airflow and the exhaust emissions inevitably deteriorate. Thus, when the voltage of the battery decreases, the valve lift quantity is held at a fixed value and the control of the intake airflow is prohibited in order to suppress the deteriorations of the exhaust emissions.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
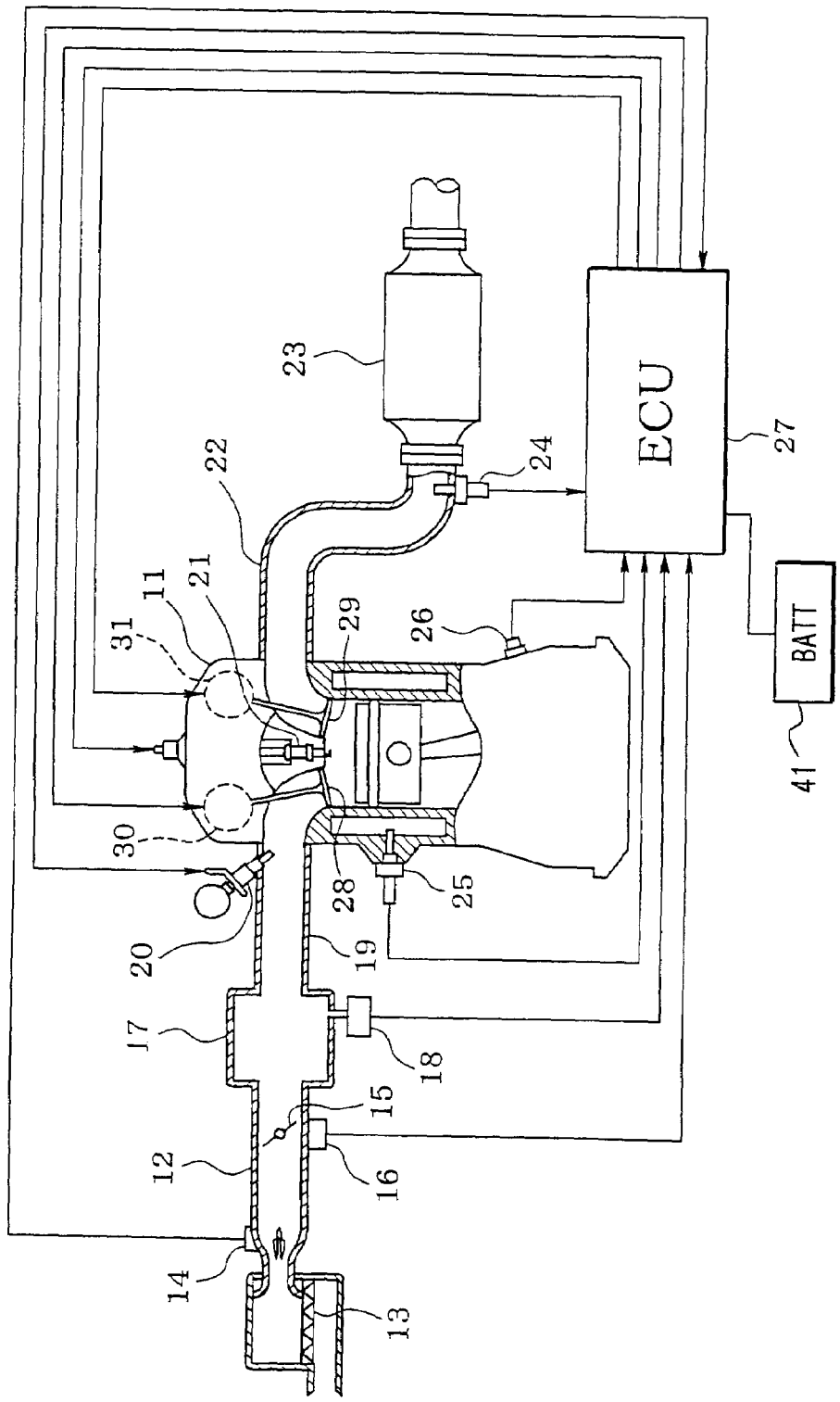
FIG. 1 is a block diagram of the configuration of an engine control system according to a first embodiment of the present invention.

Some preferred embodiments of the present invention are explained by referring to diagrams as follows. First of all, a rough configuration of an entire engine control system is explained by referring to FIG. 1. An air cleaner 13 is provided at the upper end of the upstream side of an intake pipe 12 employed in an internal combustion engine 11. An airflow meter 14 for detecting an intake airflow is provided the downstream of the air cleaner 13. Downstream of the airflow meter 14, there are provided a throttle valve 15, the opening of which can be adjusted by typically a DC motor, and a throttle-opening sensor 16 for detecting an opening of the throttle valve 15.

A surge tank 17 is further provided downstream of the throttle valve 15. On the surge tank 17, there is provided an intake-pipe-pressure sensor 18 for detecting a pressure of air in the intake pipe 12. In addition, on the surge tank 17, there is provided an intake manifold 19 for introducing air into cylinders employed in the engine 11. At locations in close proximity to an intake port of the intake manifold 19, there are provide fuel injection valves 20 for injecting fuel into their respective cylinders. Ignition plugs 21 each provided for one of the cylinders are installed on cylinder heads of the engine 11. Mixed gas in a cylinder is ignited by a spark electric discharge of the ignition plug 21 provided for the cylinder.

On an intake valve 28 employed in the engine 11, there is provided a variable-valve lift mechanism 30 for changing the lift quantity of the intake valve 28. By the same token, on an exhaust valve 29 employed in the engine 11, there is provided a variable-valve lift mechanism 31 for changing the lift quantity of the exhaust valve 29 in addition, on the intake valve 28, it is possible to provide a variable-valve lift mechanism for changing the valve timing of the intake valve 28. In the same way, on the exhaust valve 29, it is possible to provide a variable-valve lift mechanism for changing the valve timing of the exhaust valve 29.

On the other hand, on an exhaust pipe 22 employed in the engine 11, there is provided a catalyst 23 such as a 3-way catalyst for reducing the amounts of emissions such as CO, HC and NOx contained in exhaust gas. Upstream of the catalyst 23, there is provided an air-fuel-ratio sensor 24 such as a linear air-fuel-ratio sensor or an oxygen sensor for detecting an air fuel ratio of exhaust gas or determining whether the air fuel ratio is on the rich or lean side. In addition, on a cylinder block of the engine 11, there are provided a cooling-water-temperature sensor 25 for detecting a temperature of cooling water and a crank-angle sensor 26 for detecting an engine speed.

Signals generated by these sensors are supplied to an engine control circuit 27 referred to hereafter as an ECU. The ECU 27 has a configuration including a microcomputer as a core component. The microcomputer executes a variety of control programs stored in an embedded ROM, which serves as a storage medium, in order to control fuel injection volumes of the fuel injection valves 20 and ignition timings of the ignition plugs 21 in accordance with an operating state of the engine 11.

Next, the configuration of the variable-valve mechanism 30 of the intake valve 28 is explained by referring to FIGS. 2 to 5. It is to be noted that, since the configuration of the variable-valve mechanism 31 of the exhaust valve 29 is the same as the configuration of the variable-valve mechanism 30 of the intake valve 28, the configuration of the variable-valve mechanism 31 is not explained specially.

Figure 2:
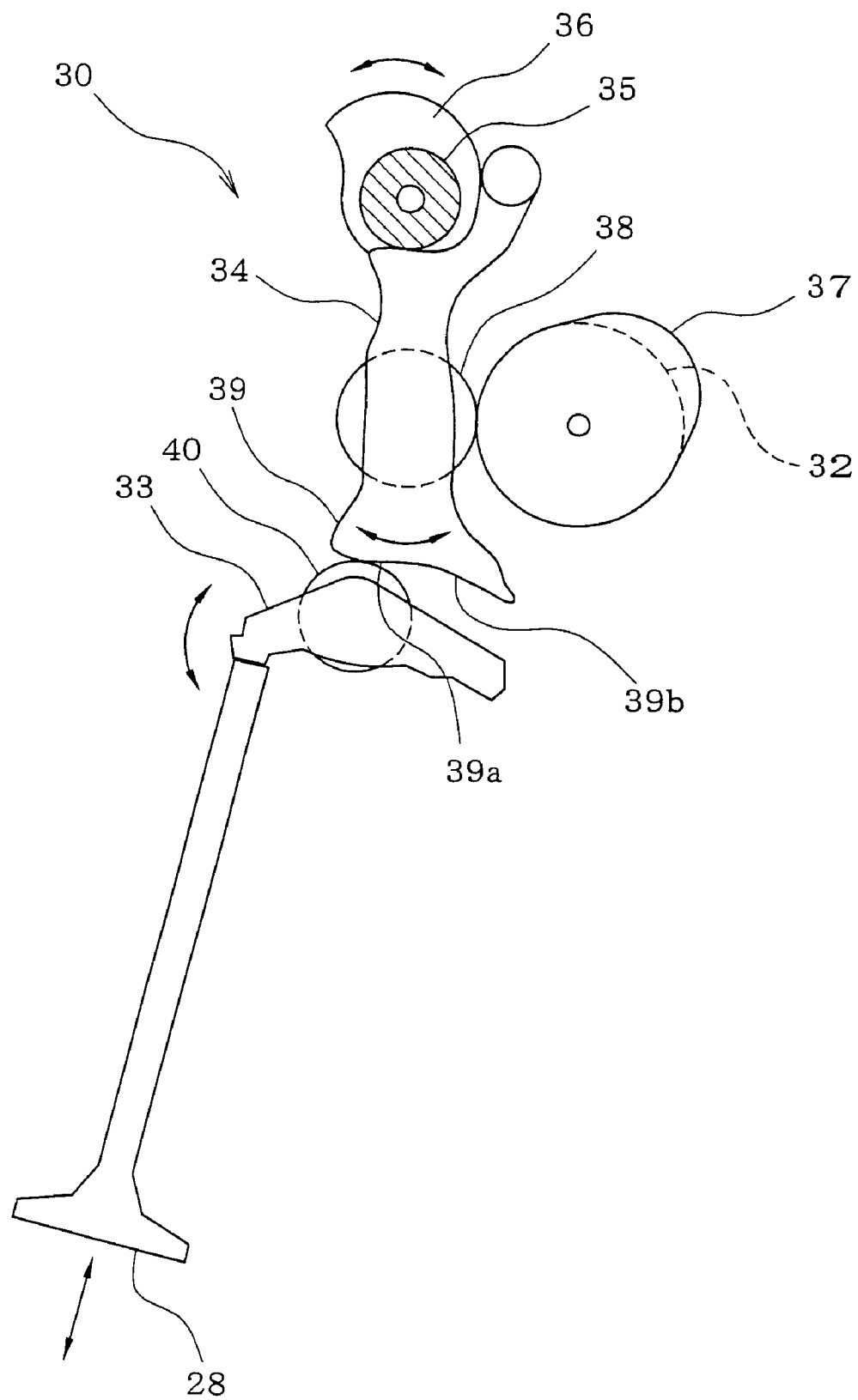
FIG. 2 is a diagram of the configuration of a variable valve according to the first embodiment of the present invention.

As shown in FIG. 2, a link arm 34 is provided between a rocker arm 33 and a cam shaft 32 for driving the intake valve 28. Above the link arm 34, there is provided a control shaft 35 rotated by a stepping motor not shown in the figure. On the control shaft 35, there is provided an eccentric cam 36 rotatable with the control shaft 35 as a single body. The link arm 34 is supported at an eccentric position relative to the axis of the eccentric cam 36 by a support shaft not shown in the figure in such a manner that the link arm 34 can be reciprocated. A reciprocating cam 38 is provided at the center of the link arm 34. A side surface of the reciprocating cam 38 is in contact with an outer circumferential surface of a cam 37 provided on the cam shaft 32. A pressure cam 39 is provided on the lower end of the link arm 34. The lower-end surface of the pressure cam 39 is in contact with the upper-end surface of a roller 40 provided at the center of the rocker arm 33.

With the above configuration, when the cam 37 is rotated by the rotation of the cam shaft 32, the reciprocating cam 38 of the link arm 34 reciprocates horizontally in accordance with the outer circumferential shape of the cam 37, causing the link arm 34 to also reciprocate horizontally as well. When the link arm 34 reciprocates horizontally, the pressure cam 39 also reciprocates horizontally so that the roller 40 of the rocker arm 33 moves up and down in accordance with the lower-end surface shape of the pressure cam 39, causing the rocker arm 33 also to move up and down as well. When the rocker arm 33 moves up and down, the intake valve 28 also moves up and down as well.

When the eccentric cam 36 is rotated by the rotation of the control shaft 35, on the other hand, the position of the support shaft of the link arm 34 moves, changing an initial contact point position between the pressure cam 39 of the link arm 34 and the roller 40 of the rocker arm 33. For the initial contact point position, refer to FIGS. 3 and 4. In addition, as shown in FIG. 2, the lower-end surface of the pressure cam 39 of the link arm 34 comprises a base surface 39a formed at such a curvature that the magnitude of a pressure of the rocker arm 33 at a left-side portion is 0, that is, the valve lift quantity of the intake valve 28 is 0, and a base surface 39b formed at such a curvature that the magnitude of a pressure of the rocker arm 33 increases when moving in the right direction starting from the base surface 39a, that is, the valve lift quantity of the intake valve 28 increases when moving in the direction.

Figure 3:
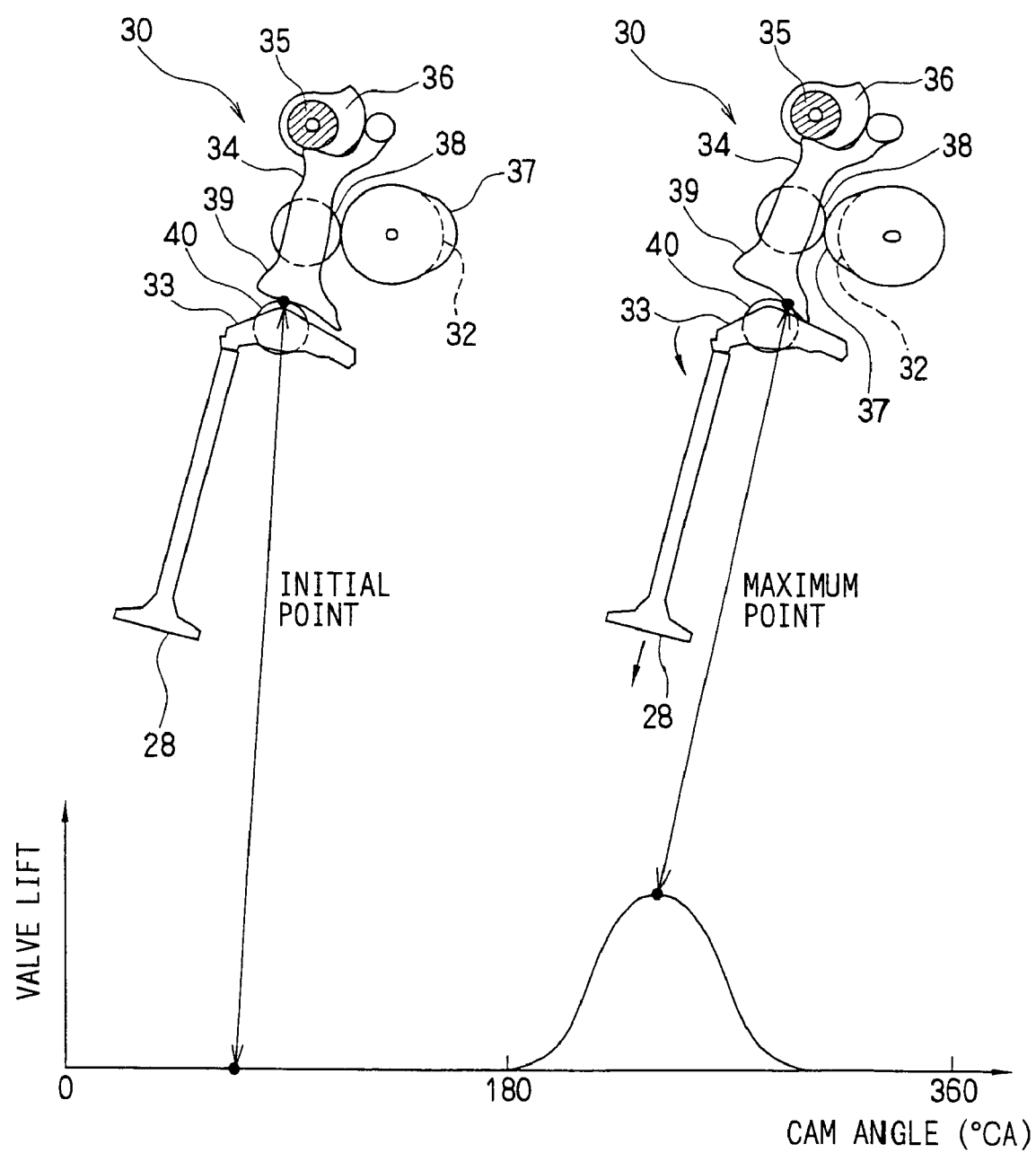
FIG. 3 is a graph representing a state of a large lift quantity of a variable-valve mechanism according to the first embodiment of the present invention.

In a large lift mode in which the valve lift quantity of the intake valve 28 is increased, the rotation of the control shaft 35 moves the initial contact point position between the pressure cam 39 of the link arm 34 and the roller 40 of the rocker arm 33 in the right direction as shown in FIG. 3. Thus, when the pressure cam 39 is reciprocated horizontally due to the rotation of the cam 37, a particular portion of the lower-end surface of the pressure cam 39 is moved to the right. Accordingly, the largest magnitude of a pressure of the rocker arm 33 increases, raising the largest valve lift quantity of the intake valve 28 and lengthening a period in which the rocker arm 33 is pressed. As a result, an opened-valve period of the intake valve 28 is also lengthened as well. By the particular portion, the portion of lower-end surface in contact with the roller 40 is meant.

Figure 4:
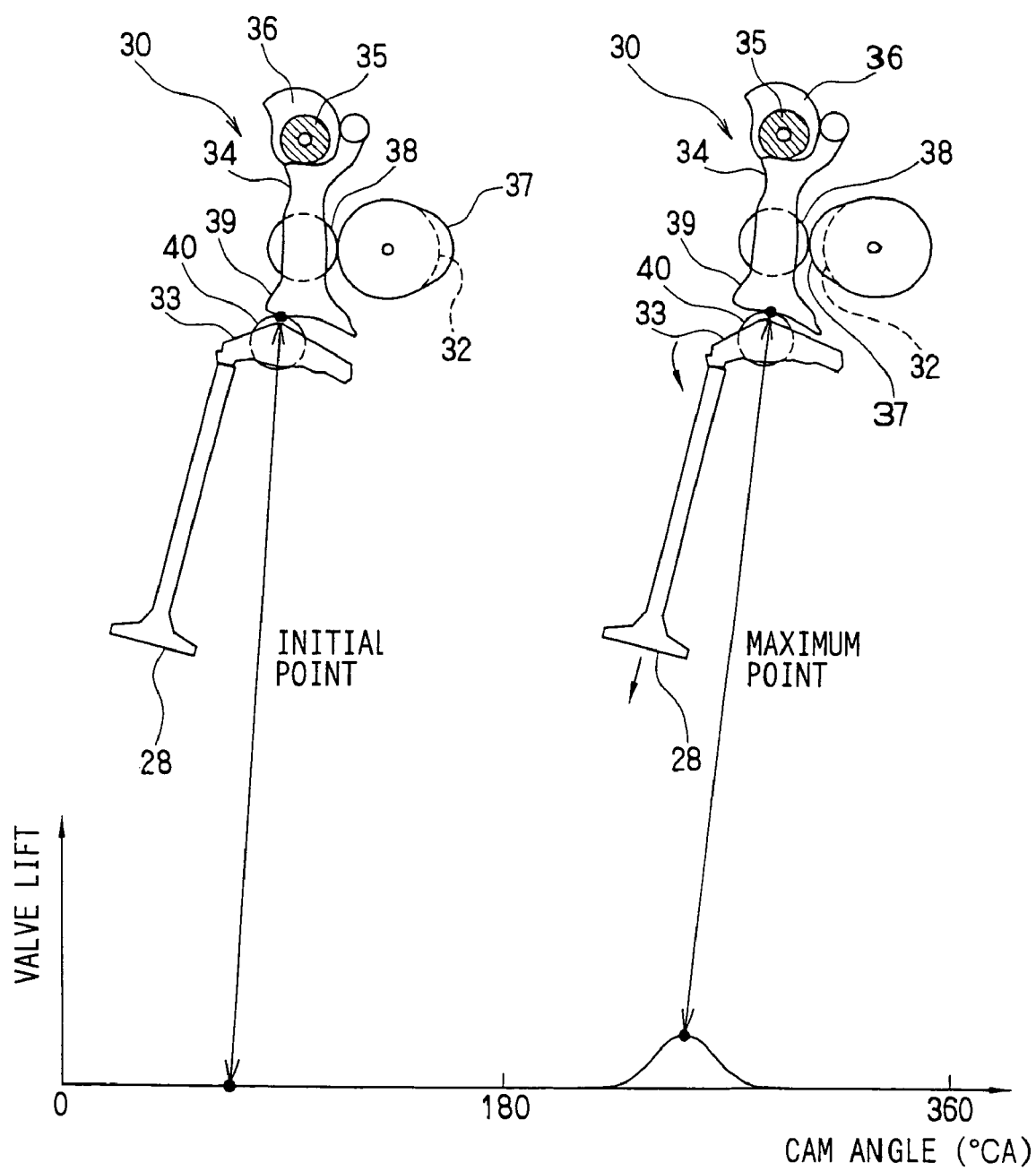
FIG. 4 is a graph representing a state of a small lift quantity of the variable-valve mechanism according to the first embodiment of the present invention.

In a small lift mode in which the valve lift quantity of the intake valve 28 is decreased, on the other hand, the rotation of the control shaft 35 moves the initial contact point position between the pressure cam 39 of the link arm 34 and the roller 40 of the rocker arm 33 in the left direction as shown in FIG. 4. Thus, when the pressure cam 39 is reciprocated horizontally due to the rotation of the cam 37, a particular portion of the lower-end surface of the pressure cam 39 is moved to the left. Accordingly, the largest magnitude of a pressure of the rocker arm 33 decreases, reducing the largest valve lift quantity of the intake valve 28 and shortening a period in which the rocker arm 33 is pressed. As a result, an opened-valve period of the intake valve 28 is also shortened as well. By the particular portion, the portion of lower-end surface in contact with the roller 40 is meant as described above.

Figure 5:
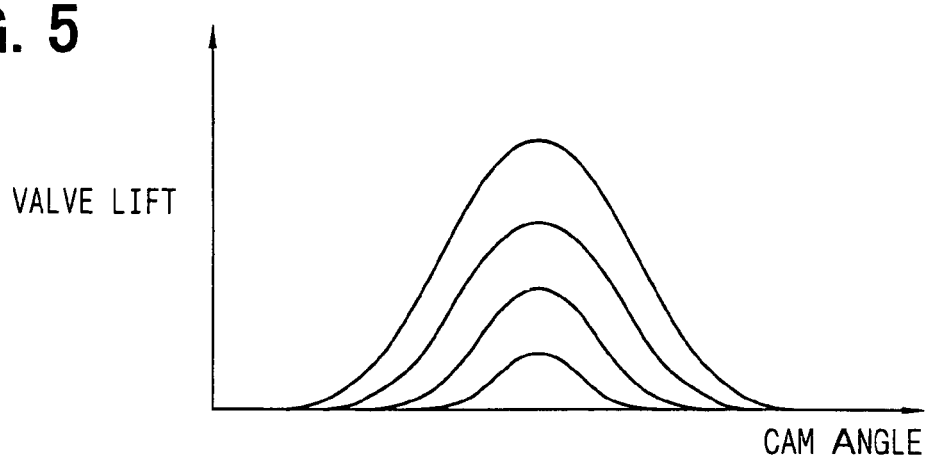
FIG. 5 is a graph representing operation characteristics of the variable-valve mechanism according to the first embodiment of the present invention.

In the variable-valve lift mechanism 30 described above, if the initial contact point position between the pressure cam 39 of the link arm 34 and the roller 40 of the rocker arm 33 is moved continuously by rotating the control shaft 35 by using the stepping motor, it is possible to continuously change the largest valve lift quantity of the intake valve 28 and the opened-valve period of the intake valve 28 as shown in FIG. 5.

Driven by power generated by a battery 41 mounted on the vehicle, the ECU 27 executes a variable-valve lift control program stored in the ROM, controlling the variable-valve lift mechanism 30 of the intake valve 28 and the variable-valve lift mechanism 31 of the exhaust valve 29 on the basis of an accelerator position, an operating state of the engine 11 and other information in order to continuously change the valve lift quantities of the intake valve 28 and the exhaust valve 29. In this case, the ECU 27 functions as a variable-valve control means for controlling the intake airflow. It is to be noted that, in a system employing a variable valve timing mechanism in conjunction with the variable-valve lift mechanisms 30 and 31, both the valve lift quantities and the valve timings may be continuously changed in order to control the intake airflow.

Figure 6:
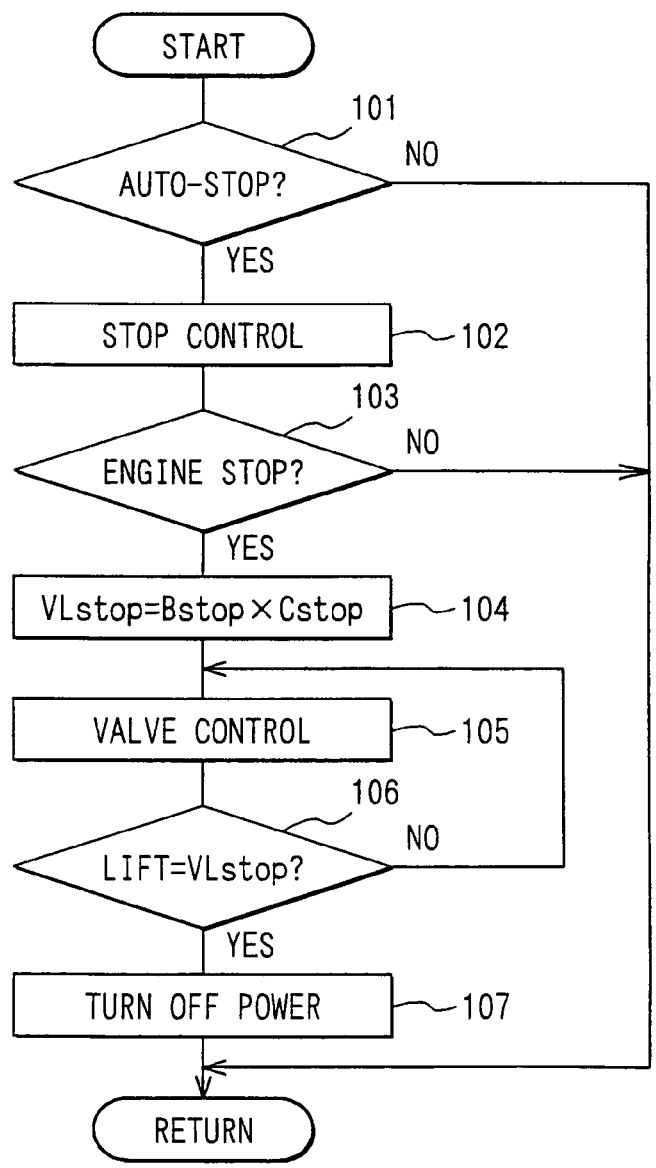
FIG. 6 is a flowchart representing engine control according to the first embodiment of the present invention.

In addition, the ECU 27 executes the automatic-stop control program of ROM shown in FIG. 6 to automatically stop the engine 11 if a predetermined automatic-stop condition is satisfied during an operation of the engine 11. Right after the automatic stop, the ECU 27 finds a target valve lift quantity VLstop of an engine automatic-stop time for the intake valve 28 and a target valve lift quantity VLstop of an engine automatic-stop time for the exhaust valve 29 on the basis of a state of the engine 11 and a state of the vehicle, controlling the valve lift quantities of the intake valve 28 and the exhaust valve 29 to their respective target valve lift quantities VLstop. The target valve lift quantity VLstop is a valve lift quantity presumed to be suitable for the next automatic start of the engine 11 or a valve lift quantity making it difficult for residual gas left in the cylinders to leak out. At a point of time the valve lift quantities of the intake valve 28 and the exhaust valve 29 become equal to their respective target valve lift quantities VLstop, the control of the variable-valve lift mechanisms 30 and 31 is discontinued.

Figure 8:
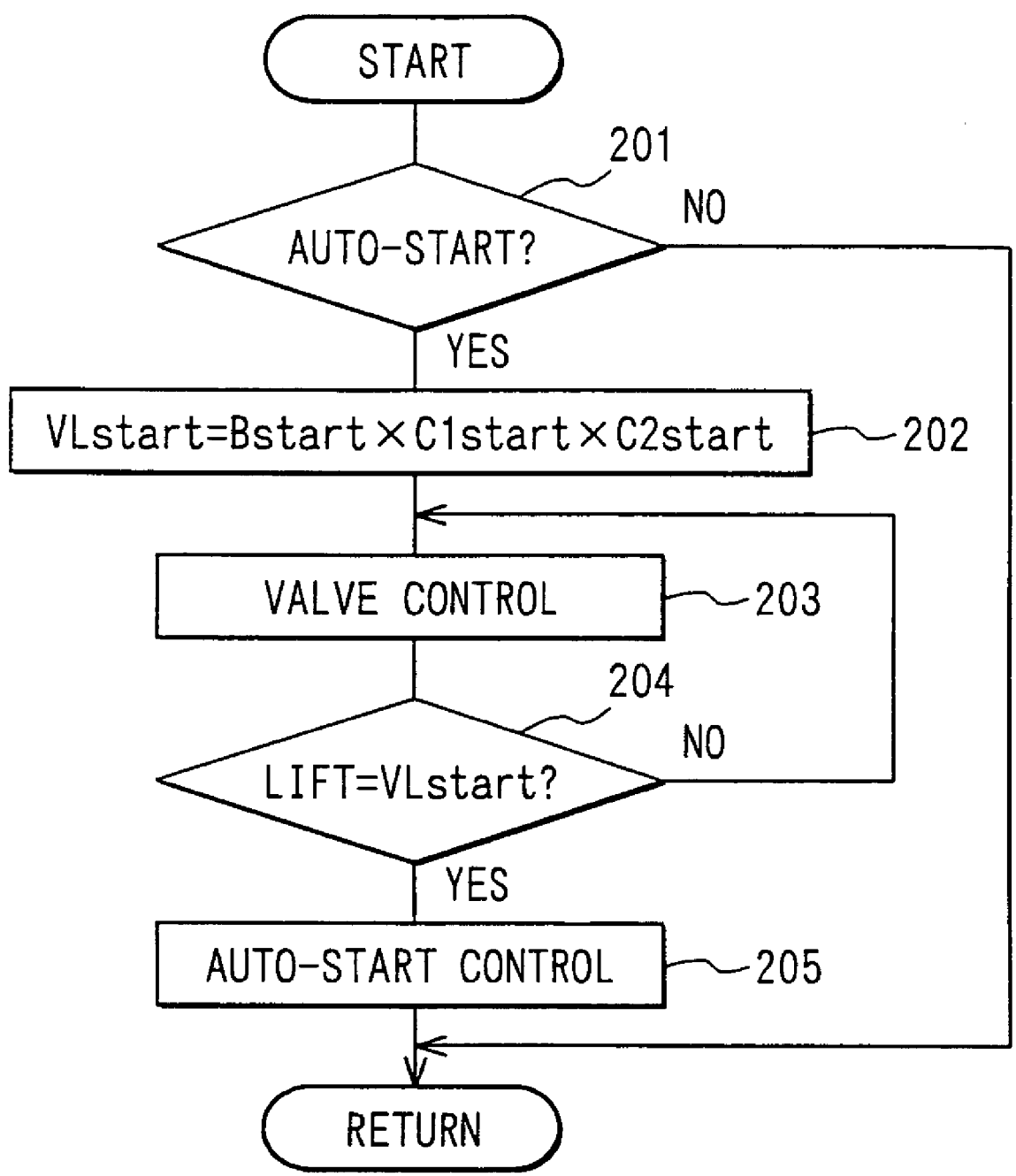
FIG. 8 is a flowchart representing other engine control according to the first embodiment of the present invention.

Furthermore, the ECU 27 executes the automatic-start control program of ROM shown in FIG. 8 to first find a target valve lift quantity VLstart of an engine automatic-start time for the intake valve 28 and a target valve lift quantity VLstart of an engine automatic-start time for the exhaust valve 29 on the basis of a state of the engine 11 and a state of the vehicle, controlling the valve lift quantities of the intake valve 28 and the exhaust valve 29 to their respective target valve lift quantities Vlstart if a predetermined automatic-start condition is satisfied in an automatic-stop state of the engine 11. The target valve lift quantity VLstart is a valve lift quantity optimum for an automatic start of the engine 11. Then, at a point of time the valve lift quantities of the intake valve 28 and the exhaust valve 29 become equal to their respective target valve lift quantities VLstart, the ECU 27 automatically starts the engine 11.

Figure 10:
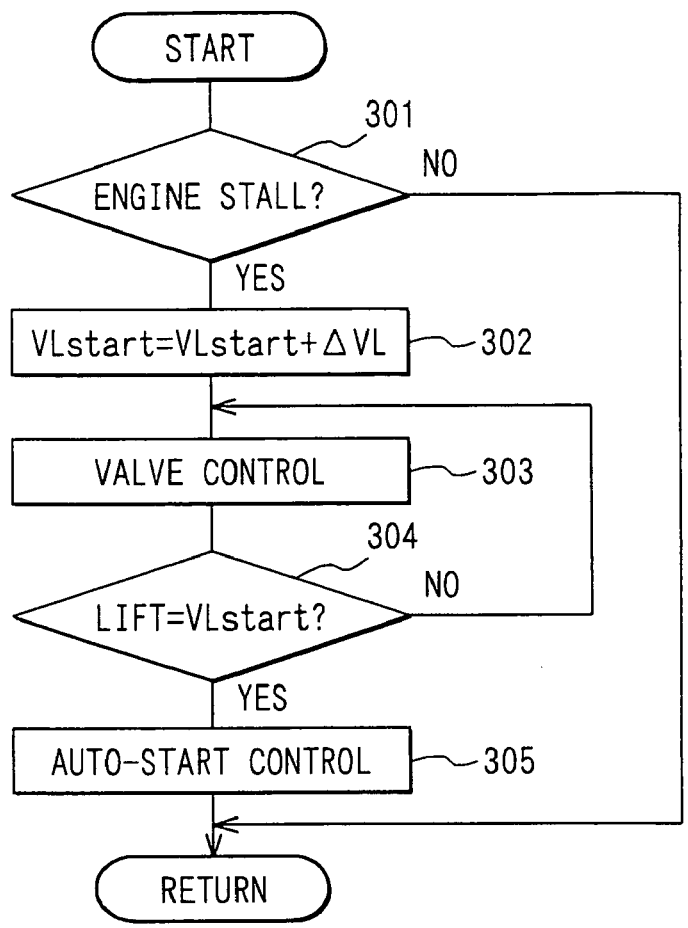
FIG. 10 is a flowchart representing further engine control according to the first embodiment of the present invention.

Moreover, the ECU 27 executes the engine-stall-generation-time control program of ROM shown in FIG. 10 to correct a target valve lift quantity VLstart of an engine automatic-start time for the intake valve 28 in a direction of increasing an intake airflow in the event of the so-called engine stall caused by a failure of an automatic start of the engine 11, and control the valve lift quantity of the intake valve 28 to the corrected target valve lift quantity VLstart of an engine automatic-start time for the intake valve 28. Then, at a point of time the valve lift quantity of the intake valve 28 becomes equal to the corrected target valve lift quantity VLstart of an engine automatic-start time for the intake valve 28, the ECU 27 automatically restarts the engine 11.

The following description explains the processing of the control programs executed by the ECU 27 by referring to flowcharts shown in FIGS. 6, 8 and 10.

Automatic-Stop Control

The automatic-stop control program represented by the flowchart shown in FIG. 6 is executed repeatedly at predetermined time intervals during the operation of the engine 11. When this program is invoked, the flowchart begins with a step 101 to determine whether or not automatic-stop conditions are satisfied. Typically, the automatic-stop conditions include conditions (1) to (3) described as follows.

(1): The speed of the vehicle shall be 0 km/h. That is, the vehicle shall be in a stopped state.

(2): The accelerator pedal shall not be depressed.

(3): The brake pedal shall be in a state of being depressed.

If conditions (1) to (3) are all satisfied, the automatic-stop conditions are considered to hold true. If even only one of conditions (1) to (3) is not satisfied, on the other hand, the automatic-stop conditions are considered not to hold true. It is to be noted that the automatic-stop conditions can be modified if necessary.

If the automatic-stop conditions are satisfied during the operation of the engine 11, a request for an engine stop is determined to exist. In this case, the flow of the program goes on to a step 102 at which automatic stop control or idling stop control is executed. In this automatic stop control, a fuel cut operation and an ignition cut operation are carried out to automatically stop the engine 11. The processing of the step 102 is carried out to play the role of an automatic stop control means.

Then, the flow of the program goes on to a step 103 to determine whether or not the automatic stop of the engine 11 has been completed by for example determining whether or not the engine speed NE has decreased to 0. At a point of time the automatic stop of the engine 11 is completed, the flow of the program goes on to a step 104 at which target valve lift quantities VLstop of the intake valve 28 and the exhaust valve 29 for the engine automatic-stop time are each computed in accordance with an equation given below. As described above, the target valve lift quantity VLstop is a valve lift quantity presumed to be suitable for the next automatic start of the engine 11 or a valve lift quantity making it difficult for residual gas left in the cylinders to leak out.

$$VLstop = Bstop \times Cstop$$

where reference notation Bstop is a basic valve lift quantity for the engine automatic-stop time and reference notation Cstop is a valve-lift-quantity correction coefficient for correcting the basic valve lift quantity Bstop.

Figure 7A:
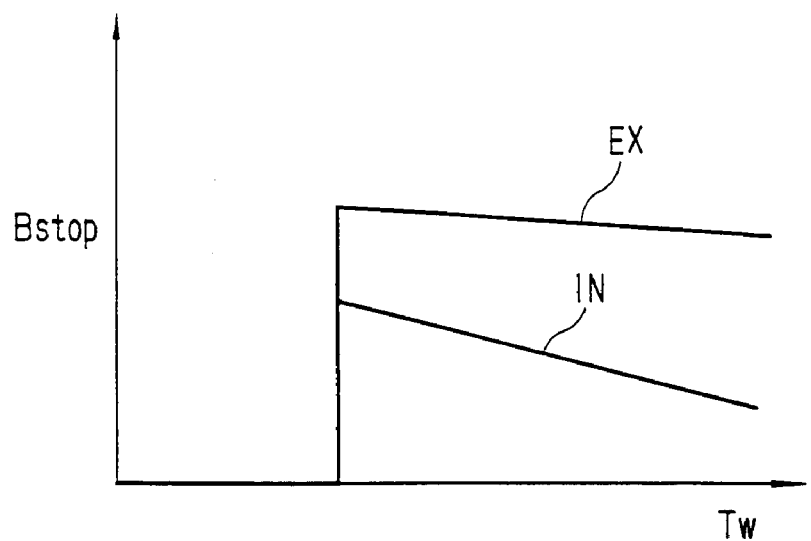
FIG. 7A is a graph representing relations between an engine cooling water temperature Tw and a basic valve lift quantity Bstop in the first embodiment of the present invention.

A basic valve lift quantity Bstop is set in dependence on an engine-cooling-water temperature detected right after the automatic stop of the engine 11 by using a formula or a map prepared for the basic valve lift quantity Bstop for the engine automatic-stop time like one shown in FIG. 7A.

In accordance with the map of basic valve lift quantity Bstop shown in FIG. 7A, in a zone where the engine-cooling-water temperature detected right after the automatic stop of the engine 11 is lower than a predetermined value and the catalyst 23 can be assumed to be in an inactivated state, the basic valve lift quantity Bstop used as a base value for the target valve lift quantity VLstop for the engine automatic-stop time is set at 0 or a minimum in order to attach importance to reduction of exhaust emissions during the automatic stop of the engine 11 and to set the target valve lift quantity VLstop at a valve lift quantity making it difficult for residual gas left in the cylinders to leak out during the automatic stop of the engine 11.

In accordance with the map of basic valve lift quantity Bstop shown in FIG. 7A, in a zone where the engine-cooling-water temperature detected right after the automatic stop of the engine 11 is at least equal to the predetermined value and the catalyst 23 can be assumed to be in an activated state, on the other hand, the basic valve lift quantity Bstop used as a base value for the target valve lift quantity VLstop for the engine automatic-stop time is set in accordance with an engine-cooling-water temperature Tw detected right after the automatic stop in order to attach importance to the next automatic start characteristic or the restart characteristic of the engine 11 and to set the target valve lift quantity VLstop at a valve lift quantity presumed to be proper for the next automatic start of the engine 11 from a standpoint of the engine-cooling-water temperature Tw detected right after the automatic stop.

In general, the lower the temperature of the engine and/or the lower the temperature of the battery mounted on the vehicle, the poorer the performance of the battery. The poorer the performance of the battery, the smaller the driving power of a starter not shown in the figure. The smaller the driving power of the starter, the lower the flowability of the engine oil. The lower the flowability of the engine oil, the greater the frictions among movable parts. Thus, the cranking of the automatic-start time is prone to variations and the automatic-start characteristic of the engine tends to deteriorate. Since the battery is mounted in the same room as the engine 11, the temperature of the battery changes due to heat dissipated by the engined 11 in accordance with the temperature of the engine 11. From this relation, when the engine cooling-water temperature representing the temperature of the engine 11 is low, the temperature of the engine 11 can be presumed to be also low as well.

In accordance with the map of basic valve lift quantity Bstop shown in FIG. 7A, in the zone where the engine-cooling-water temperature detected right after the automatic stop of the engine 11 is at least equal to the predetermined value and the catalyst 23 can be assumed to be in an activated state, the lower the engine cooling-water temperature representing the temperature of the engine 11, the larger the value at which the basic valve lift quantity Bstop is set. Thus, in order to cope with the fact that the driving power of the starter is small at a low temperature of the battery, causing greater frictions among movable parts and, hence, making the cranking of the automatic-start time of the engine 11 prone to variations, the basic valve lift quantity Bstop is set at a relatively large value in order to change the target valve lift quantity VLstop in a direction of stabilizing the cranking such as a direction of increasing the intake airflow at the automatic-start time of the engine 11.

On the other hand, the valve lift quantity correction coefficient Cstop is a correction coefficient, which is used for correcting the basic valve lift quantity Bstop for the engine automatic-stop time when the performance of the battery deteriorates due to a large number of operations carried out so far to automatically start the engine 11. A valve lift quantity correction coefficient Cstop is determined in dependence on the number of engine automatic stops carried out so far or the number of engine automatic starts carried out so far by using a formula or the map of valve lift quantity correction coefficient Cstop shown in FIG. 7B.

In general, the larger the number of engine automatic stops carried out so far or the number of engine automatic starts carried out so far, the larger the consumption of power from the battery and, hence, the lower the performance of the battery. Thus, the larger the number of engine automatic stops carried out so far or the number of engine automatic starts carried out so far, the smaller the driving power of the starter. As a result, as the number of engine automatic stops carried out so far or the number of engine automatic starts carried out so far increases, the automatic start characteristic of the engine 11 tends to deteriorate.

Figure 7B:
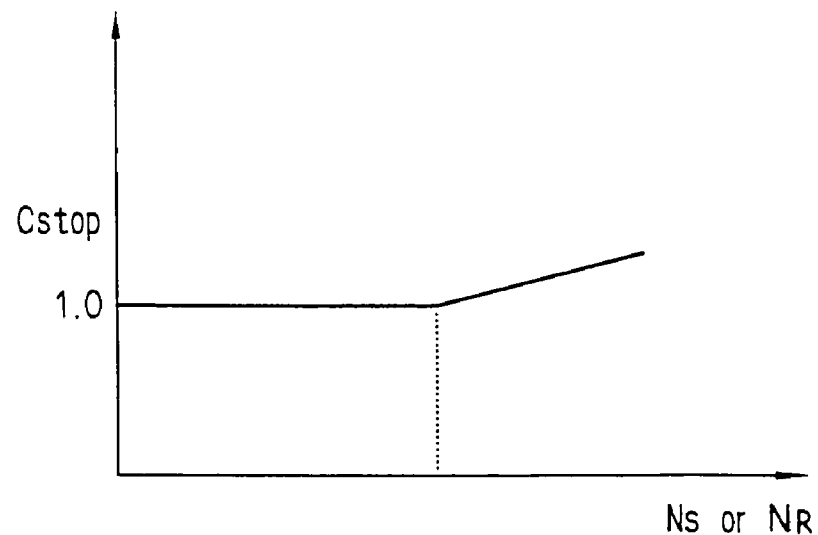
FIG. 7B is a graph representing a relation between an engine-automatic-stop count NS or an engine-automatic-start count NR and a valve-lift-quantity correction coefficient Cstop in the first embodiment of the present invention.

From the relation described above, the map of valve lift quantity correction coefficient Cstop shown in FIG. 7B is created so that, in a zone where the number of engine automatic stops carried out so far or the number of engine automatic starts carried out so far is greater than a predetermined value, that is, in a zone where the deterioration of performance of battery caused by the increased number of operations carried out so far to automatically start the engine 11 cannot be ignored, the larger the number of engine automatic stops carried out so far or the number of engine automatic starts carried out so far, the larger the value at which the valve lift quantity correction coefficient Cstop is set. Thus, the larger the number of engine automatic stops carried out so far or the number of engine automatic starts carried out so far, the smaller the driving power of the starter and, hence, the more the cranking at the automatic-start time of the engine 11 is prone to variations, the larger the value at which the valve lift quantity correction coefficient Cstop is set. A large valve lift quantity correction coefficient Cstop changes the target valve lift quantity VLstop in a direction of stabilizing the cranking or a direction of increasing the intake airflow. In a zone where the number of engine automatic stops carried out so far or the number of engine automatic starts carried out so far is smaller than the predetermined value, that is, in a zone where the deterioration of performance of battery caused by the increased number of operations carried out so far to automatically start the engine 11 can be almost ignored, on the other hand, the valve lift quantity correction coefficient Cstop is set at 1.0. In this zone, the target valve lift quantity VLstop is equal to the basic valve lift quantity Bstop.

In the map of basic valve lift quantity Bstop shown in FIG. 7A, as temperature information for determining a temperature of the engine 11 and/or a temperature of the battery, an engine cooling-water temperature Tw is used. It is to be noted, however, that another temperature such as an intake air temperature Ti, an ambient temperature Ta or an oil temperature To can also be used as well. In a word, it is preferable to find a basic valve lift quantity Bstop on the basis of one, two or more pieces of such temperature information.

At the step 104, the basic valve lift quantity Bstop is corrected by multiplying the basic valve lift quantity Bstop by the valve lift quantity correction coefficient Cstop to find a target valve lift quantity VLstop for the automatic-stop time of the engine 11. However, the basic valve lift quantity Bstop can also be used as a target valve lift quantity VLstop for the automatic-stop time of the engine 11 as it is without correction of the basic valve lift quantity Bstop by multiplying the basic valve lift quantity Bstop by the valve lift quantity correction coefficient Cstop.

After finding the target valve lift quantity VLstop for the automatic-stop time of the engine 11, the flow of the program goes on to a step 105 at which variable-valve lift control is executed to control the variable-valve lift mechanism 30 of the intake valve 28 and the variable-valve lift mechanism 31 of the exhaust valve 29 so that the valve lift quantities of the intake valve 28 and the exhaust valve 29 are adjusted to their respective target valve lift quantities VLstop. The processing of the steps 104 and 105 is carried out to play the role of an automatic-stop-time valve control means.

The flow of the program goes on to a step 106 to determine whether or not the valve lift quantities of the intake valve 28 and the exhaust valve 29 have each been adjusted to the target valve lift quantity VLstop. At a point of time the valve lift quantities of the intake valve 28 and the exhaust valve 29 become equal to their respective target valve lift quantities VLstop, the flow of the program goes on to a step 107 at which conductions of currents to the driving motors of the variable-valve lift mechanisms 30 and 31 are halted.

By carrying out the processing described above, the variable-valve lift mechanisms 30 and 31 are halted with the valve lift quantities of the intake valve 28 and the exhaust valve 29 set at their respective target valve lift quantities VLstop, which are each a valve lift quantity presumed to be suitable for the next automatic start or a valve lift quantity making it difficult for residual gas left in the cylinders to leak out.

It is to be noted that, in a system employing a variable valve timing mechanism in conjunction with the variable-valve lift mechanisms 30 and 31, when the engine 11 is automatically stopped, control can be executed to adjust the valve lift quantities to their respective target valve lift quantities for the automatic stop of the engine 11 and the valve timings to their respective target valve timings for the automatic stop of the engine 11.

Automatic Start Control

The automatic-start control program represented by the flowchart shown in FIG. 8 is executed repeatedly at predetermined time intervals during an automatic stop of the engine 11. When this program is invoked, the flowchart begins with a step 201 to determine whether or not automatic-start conditions are satisfied. In the case of a manual-transmission car (an MT car), typically, the automatic-start conditions include conditions (1) to (3) described as follows.

(1): The speed of the vehicle shall be 0 km/h. That is, the vehicle shall be in a stopped state.

(2): The clutch pedal shall be in a state of being depressed.

(3): The brake pedal shall be in a state of not being depressed.

If conditions (1) to (3) are all satisfied, the automatic-start conditions are considered to hold true. If even only one of conditions (1) to (3) is not satisfied, on the other hand, the automatic-start conditions are considered not to hold true.

It is to be noted that the automatic-start conditions can be modified if necessary. In the case of an automatic-transmission car (an AT car), on the other hand, the automatic-start conditions are typically considered to be satisfied when the shift lever has been shifted to a drive range or the like with the brake pedal put in a state of being depressed. In a word, the automatic-start conditions are considered to be satisfied when the driver has carried out operations in a preparation for running the vehicle, be the vehicle an AT car or an MT car.

If the automatic-start conditions are satisfied in an automatic-stop state of the engine 11, a request for an engine start is determined to exist. In this case, the flow of the program goes on to a step 202 at which target valve lift quantities VLstart of the intake valve 28 and the exhaust valve 29 for the engine automatic-start time are each computed in accordance with an equation given below. As described above, the target valve lift quantity VLstart is a valve lift quantity presumed to be optimum for the automatic-start time of the engine 11.

$$VLstart = Bstart \times C1start \times C2start$$

where reference notation Bstart is a basic valve lift quantity for the engine automatic-start time whereas reference notations C1start and C2start are respectively first and second valve-lift-quantity correction coefficients for correcting the basic valve lift quantity Bstart.

Figure 9A:
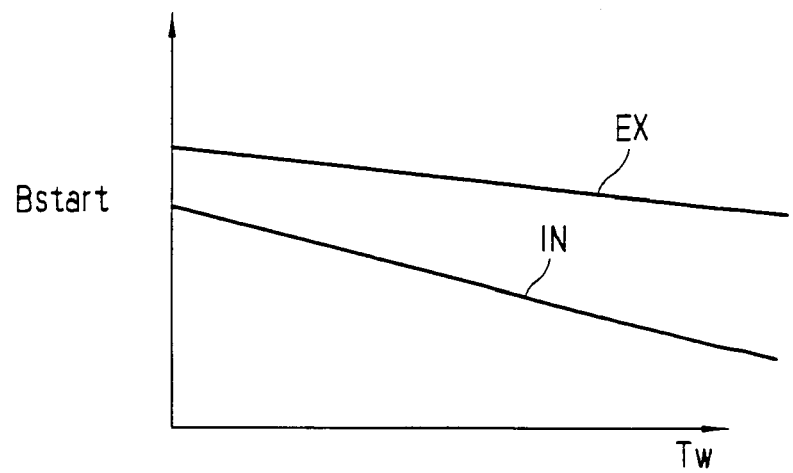
FIG. 9A is a graph representing other relations between the engine cooling water temperature Tw and the basic valve lift quantity Bstart in the first embodiment of the present invention.

A basic valve lift quantity Bstart is set in dependence on an engine-cooling-water temperature Tw detected immediately before an automatic start of the engine 11 by using a formula or a map prepared for the basic valve lift quantity Bstart for the engine automatic-start time like one shown in FIG. 9A.

In accordance with the basic valve lift quantity Bstart's map shown in FIG. 9A, the lower the engine cooling-water temperature Tw used as temperature information indicating the temperatures of the engine 11 and the battery, the larger the value at which the basic valve lift quantity Bstart is set. Thus, in order to cope with the fact that the driving power of the starter is small at a low temperature of the engine 11 or the battery, causing greater frictions among movable parts and, hence, making the cranking of the automatic-start time of the engine 11 prone to variations, the basic valve lift quantity Bstart is set at a relatively large value in order to change the target valve lift quantity VLstart in a direction of stabilizing the cranking such as a direction of increasing the intake airflow at the automatic-start time of the engine 11.

Figure 9B:
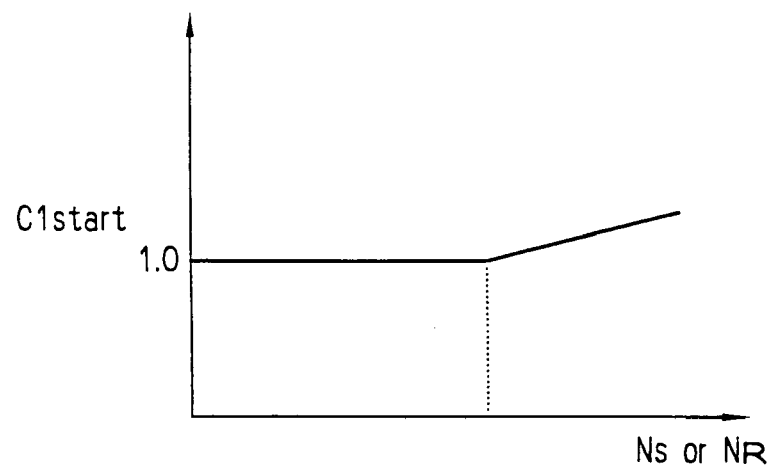
FIG. 9B is a graph representing another relation between the engine-automatic-stop count NS or the engine-automatic-start count NR and a first valve-lift-quantity correction coefficient C1start in the first embodiment of the present invention.

On the other hand, the first valve lift quantity correction coefficient C1start is a correction coefficient, which is used for correcting the basic valve lift quantity Bstart for the engine automatic-start time when the performance of the battery deteriorates due to a large number of operations carried out so far to automatically start the engine 11. A first valve lift quantity correction coefficient C1start is determined in dependence on the number of engine automatic stops carried out so far or the number of engine automatic starts carried out so far by using a formula or the map of first valve lift quantity correction coefficient C1start shown in FIG. 9B. In the following description, the number of engine automatic stops carried out so far and the number of engine automatic starts carried out so far are also referred to as an engine automatic stop count NS and an engine automatic start count NR respectively. The map of first valve lift quantity correction coefficient C1start shown in FIG. 9B is created so that, in a zone where the number of engine automatic stops carried out so far or the number of engine automatic starts carried out so far is smaller than a predetermined value, that is, in a zone where the deterioration of performance of battery caused by the increased number of operations carried out so far to automatically start the engine 11 can be almost ignored, the first valve lift quantity correction coefficient C1start is set at 1.0. In a zone where the number of engine automatic stops carried out so far or the number of engine automatic starts carried out so far is greater than the predetermined value, that is, in a zone where the deterioration of performance of battery caused by the increased number of operations carried out so far to automatically start the engine 11 cannot be ignored, on the other hand, the larger the number of engine automatic stops carried out so far or the number of engine automatic starts carried out so far, the larger the value at which the first valve lift quantity correction coefficient C1start is set.

Figure 9C:
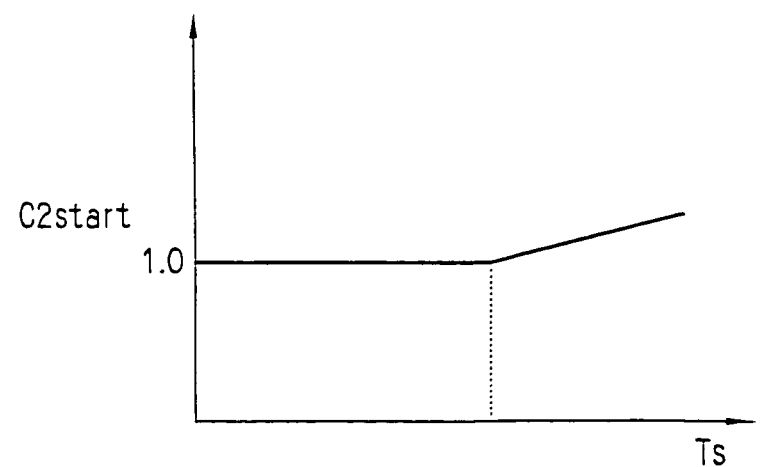
FIG. 9C is a graph representing a relation between an engine-automatic-stop time Ts and a second valve-lift-quantity correction coefficient C2start in the first embodiment of the present invention.

In addition, the second valve lift quantity correction coefficient C2start is a correction coefficient, which is used for correcting the basic valve lift quantity Bstart for the engine automatic-start time when the performance of the battery deteriorates due to a long automatic-stop time Ts of the engine 11 or large consumption of power from the battery during the automatic stop of the engine 11. A second valve lift quantity correction coefficient C2start is determined in dependence on the automatic-stop time Ts of the engine 11 by using a formula or the map of second valve lift quantity correction coefficient C2start shown in FIG. 9C. The map of second valve lift quantity correction coefficient C2start shown in FIG. 9C is created so that, in a zone where the automatic-stop time Ts of the engine 11 is smaller than a predetermined value, that is, in a zone where the deterioration of performance of battery caused by the large consumption of power from the battery during the automatic stop of the engine 11 can be almost ignored, the second valve lift quantity correction coefficient C2start is set at 1.0 meaning no correction of the basic valve lift quantity Bstart. In a zone where the automatic-stop time Ts of the engine 11 is greater than the predetermined value, that is, in a zone where the deterioration of performance of battery caused by the large consumption of power from the battery during the automatic stop of the engine 11 cannot be ignored, on the other hand, the longer the automatic-stop time Ts of the engine 11, the larger the value at which the second valve lift quantity correction coefficient C2start is set.

When the number of engine automatic stops carried out so far or the number of engine automatic starts carried out so far increases or when the automatic-stop time Ts of the engine 11 becomes long, the driving power of the starter decreases, making the cranking of the automatic-start time of the engine 11 prone to variations. In this case, the first valve lift quantity correction coefficient C1start or the second valve lift quantity correction coefficient C2start is set at a large value, which changes the target valve lift quantity VLstart in a direction of stabilizing the cranking or a direction of increasing the intake airflow at the automatic start of the engine 11.

In the basic valve lift quantity Bstart map shown in FIG. 9A, as temperature information for determining a temperature of the engine 11 and/or a temperature of the battery, an engine cooling-water temperature Tw is used. It is to be noted, however, that another temperature such as an intake air temperature Ti, an ambient temperature Ta or an oil temperature To can also be used as well. In a word, it is preferable to find a basic valve lift quantity Bstart on the basis of one, two or more pieces of such temperature information.

Then, at the step 202, the basic valve lift quantity Bstart is corrected by multiplying the basic valve lift quantity Bstart by the first valve lift quantity correction coefficient C1start and the second valve lift quantity correction coefficient C2start to find a target valve lift quantity VLstart for the automatic-start time of the engine 11. However, one of the first valve lift quantity correction coefficient C1start and the second valve lift quantity correction coefficient C2start or both can be eliminated from the formula for computing a target valve lift quantity VLstart.

After finding the target valve lift quantity VLstart for the automatic-start time of the engine 11, the flow of the program goes on to a step 203 at which variable-valve lift control is executed to control the variable-valve lift mechanism 30 of the intake valve 28 and the variable-valve lift mechanism 31 of the exhaust valve 29 so that the valve lift quantities of the intake valve 28 and the exhaust valve 29 are adjusted to their respective target valve lift quantities VLstart. The processing of the steps 202 and 203 is carried out to play the role of an automatic-start-time valve control means.

The flow of the program goes on to a step 204 to determine whether or not the valve lift quantities of the intake valve 28 and the exhaust valve 29 have been adjusted to their respective target valve lift quantities VLstart. At a point of time the valve lift quantities of the intake valve 28 and the exhaust valve 29 become equal to their respective target valve lift quantities VLstart, the flow of the program goes on to a step 205 at which automatic start control is executed to turn on the starter and to start the engine 11 automatically. The processing of the step 205 is carried out to play the role of an automatic-start control means.

By carrying out the processing described above, the engine 11 is automatically started with the valve lift quantities of the intake valve 28 and the exhaust valve 29 set at their respective target valve lift quantities Vlstart.

It is to be noted that, in a system employing a variable valve timing mechanism in conjunction with the variable-valve lift mechanisms 30 and 31, when the engine 11 is automatically started, control can be executed to adjust the valve lift quantities to their respective target valve lift quantities for the automatic-start time of the engine 11 and the valve timings to their respective target valve timings for the automatic-start time of the engine 11.

Engine-Stall-Generation-Time Control

The engine-stall-generation-time control program represented by the flowchart shown in FIG. 10 is executed repeatedly at predetermined time intervals after the start of automatic-start control. When this program is invoked, the flowchart begins with a step 301 to determine whether or not the engine so-called engine stall has been generated due to a failure of an automatic start of the engine 11 by, typically, determining whether or not the engine speed NE has decreased to 0. If no engine stall has been generated, the execution of the program is ended without doing anything.

If an engine stall has been generated, on the other hand, the flow of the program goes on to a step 302 at which the target valve lift quantity VLstart set for the intake valve 28 to be used at an automatic-start time of the engine 11 is increased by a predetermined valve lift quantity increment $\Delta VL$ in a correction process to increase the intake airflow as follows:

$VLstart = VLstart + \Delta VL$

Figure 11:
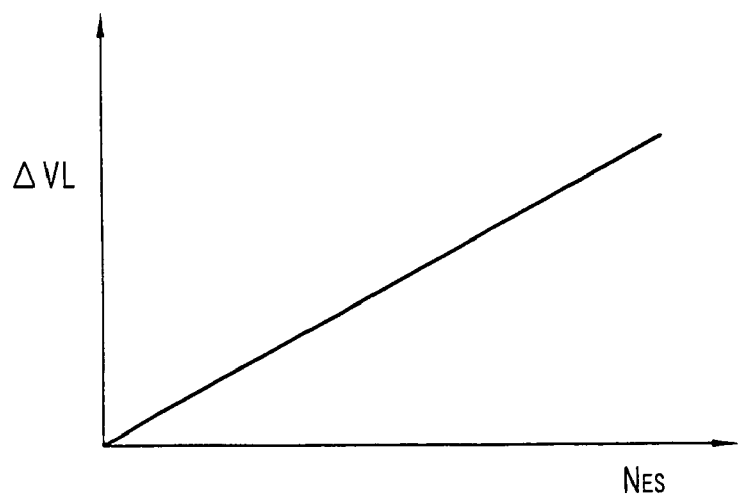
FIG. 11 is a graph representing a relation between an engine-stall count Nes and a valve lift quantity increase $\Delta$VL in the first embodiment of the present invention.

A valve lift quantity increment $\Delta VL$ is determined in dependence on the number of previous engine stalls by using a formula or the valve lift quantity increment $\Delta VL$'s map like one shown in FIG. 11. In accordance with the valve lift quantity increment $\Delta VL$'s map, the larger the number of previous engine stalls, the larger the value at which a valve lift quantity increment $\Delta VL$ is set.

After correcting the target valve lift quantity VLstart for the automatic-start time of the engine 11, the flow of the program goes on to a step 303 at which variable-valve lift control is executed to control the variable-valve lift mechanism 30 of the intake valve 28 so that the valve lift quantity of the intake valve 28 is adjusted to the corrected target valve lift quantity VLstart.

The flow of the program goes on to a step 304 to determine whether or not the valve lift quantities of the intake valve 28 and the exhaust valve 29 have been adjusted to their respective corrected target valve lift quantities VLstart. At a point of time the valve lift quantities of the intake valve 28 and the exhaust valve 29 become equal to their respective corrected target valve lift quantities VLstart, the flow of the program goes on to a step 305 at which automatic start control is re-executed to automatically start the engine 11.

It is to be noted that, in a system employing a variable valve timing mechanism in conjunction with the variable-valve lift mechanisms 30 and 31, when an engine stall is generated, the target valve lift quantities for the automatic-start time of the engine 11 and the target valve timings for the automatic-start time of the engine 11 can each be corrected to increase the intake airflow.

Figure 12:
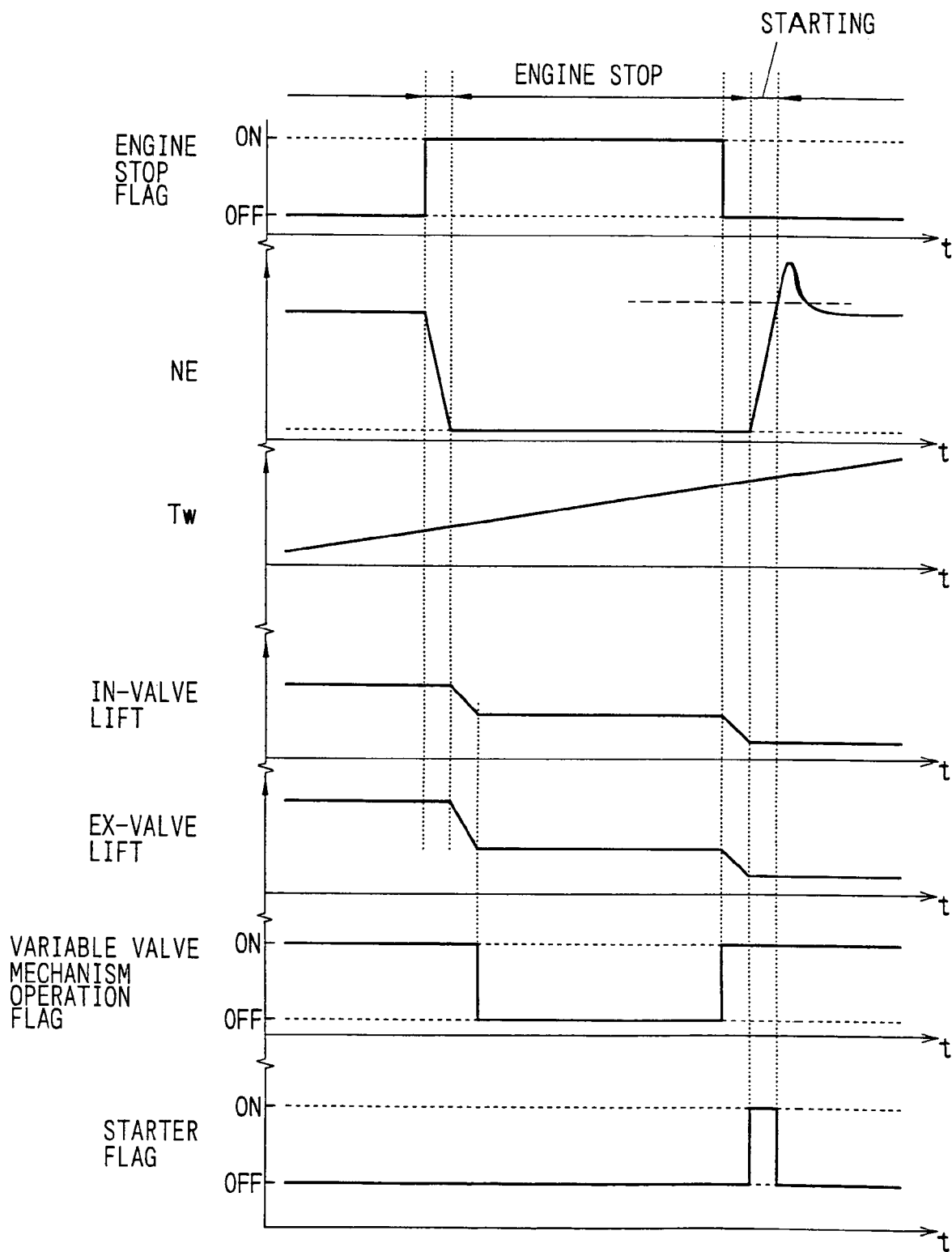
FIG. 12 is a time chart representing engine control according to the first embodiment of the present invention.
Figure 13:
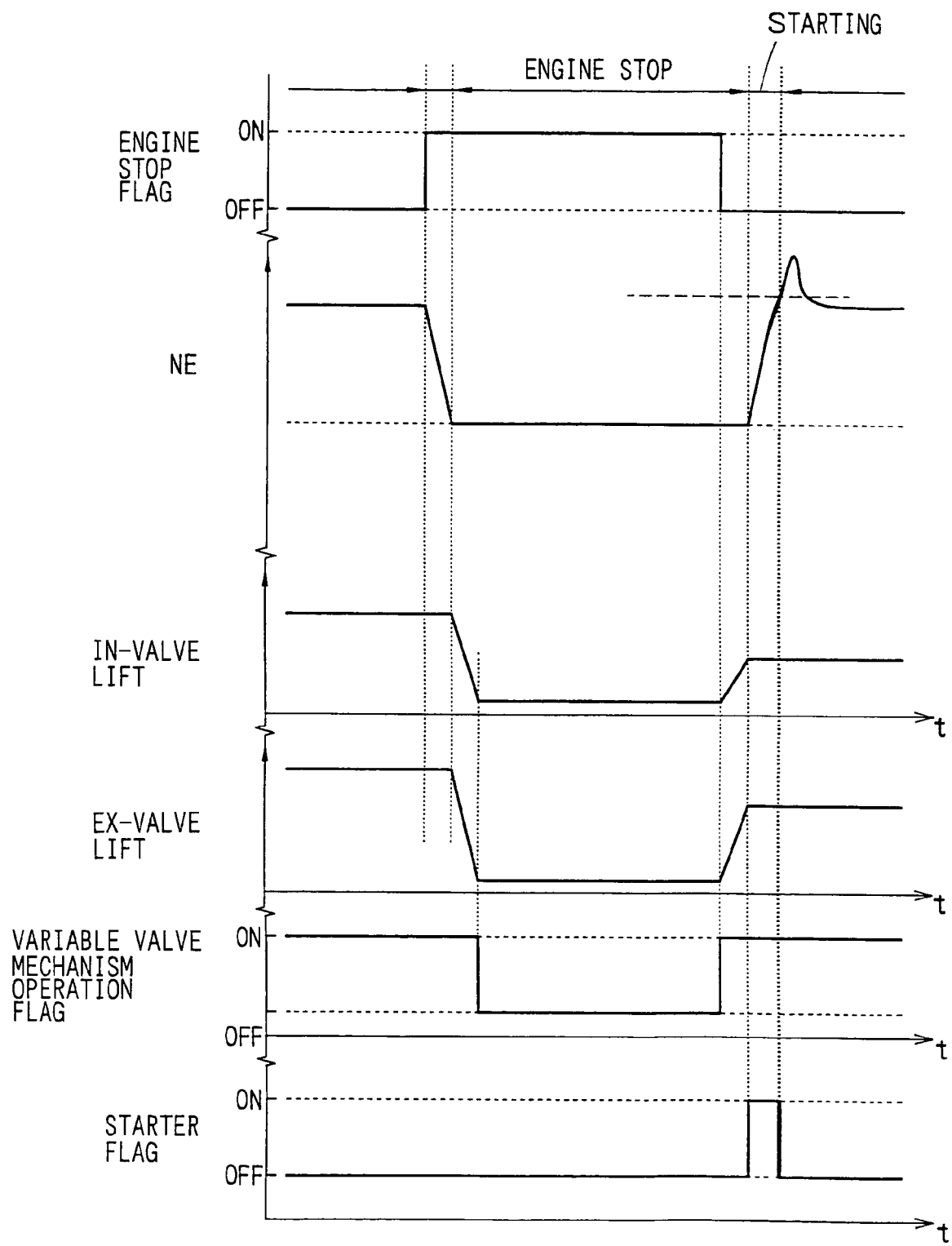
FIG. 13 is a time chart representing other engine control according to the first embodiment of the present invention.
Figure 14:
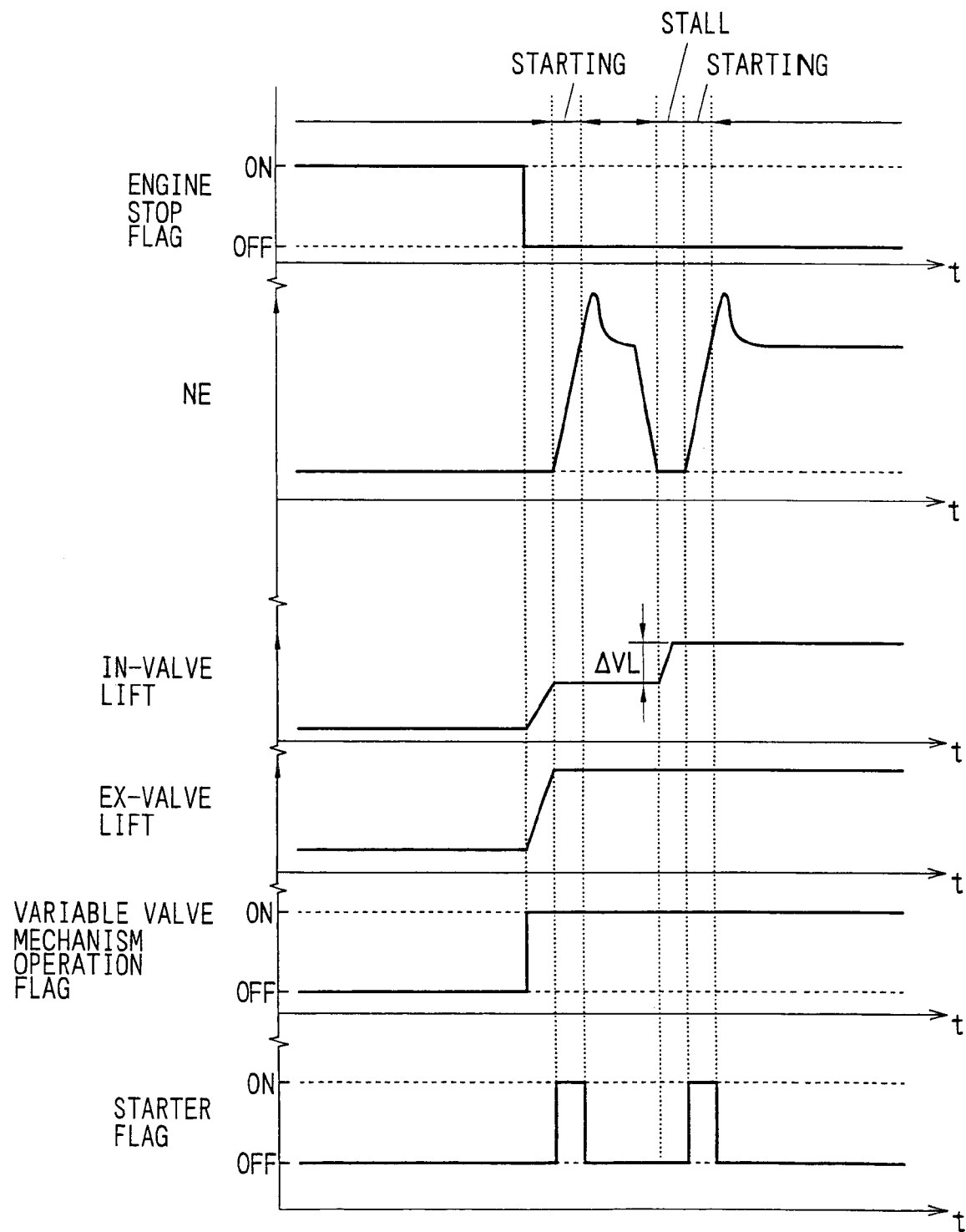
FIG. 14 is a time chart representing further engine control according to the first embodiment of the present invention.

FIGS. 12 to 14 show time charts for the programs represented by the flowcharts shown in FIGS. 6, 8 and 10.

The time charts shown in FIG. 12 are time charts of typical control, which is executed when an engine cooling-water temperature Tw is determined to be higher than a predetermined value and the catalyst 23 is determined to have been activated. In this case, when the automatic stop conditions are satisfied during an operation of the engine 11, the engine 11 is automatically stopped. Right after the engine 11 is automatically stopped, since the engine cooling-water temperature Tw is determined to be higher than the predetermined value and the catalyst 23 is determined to have been activated, the target valve lift quantities VLstop of the intake valve 28 and the exhaust valve 29 for the engine automatic-stop time are set in accordance with an engine-cooling-water temperature Tw detected right after the automatic stop and in accordance with other information in order to attach importance to the next automatic start characteristic or the restart characteristic of the engine 11. After the valve lift quantities VLstop for the intake valve 28 and the exhaust valve 29 are controlled to their respective target valve lift quantities VLstop for the engine automatic-stop time, which have each been set at a valve lift quantity presumed to be suitable for the next automatic start, the execution of the control of the variable-valve lift mechanisms 30 and 31 is ended. In this way, during the automatic stop of the engine 11, the variable-valve lift mechanisms 30 and 31 are halted with the valve lift quantities of the intake valve 28 and the exhaust valve 29 set at their respective target valve lift quantities VLstop, which are each a valve lift quantity presumed to be suitable for the next automatic start.

When the automatic start conditions are satisfied during the automatic stop of the engine 11, target valve lift quantities VLstart of the intake valve 28 and the exhaust valve 29 for the engine automatic-start time are each set at a valve lift quantity presumed to be optimum for the automatic start on the basis of an engine-cooling-water temperature Tw detected immediately before the automatic start and on the basis of other information. Then, after the valve lift quantities of the intake valve 28 and the exhaust valve 29 are corrected from their respective target valve lift quantities VLstop for the engine automatic-stop time to their respective target valve lift quantities VLstart for the engine automatic-start time, the engine 11 is automatically started. The target valve lift quantities VLstop for the engine automatic-stop time are each a valve lift quantity presumed to be suitable for an automatic start. On the other hand, the target valve lift quantities VLstart for the engine automatic-start time are each a valve lift quantity optimum for an automatic start. In this way, at an automatic-start time of the engine 11, the engine 11 can be automatically started at a valve lift quantity suitable for the automatic start. It is thus possible to improve the automatic-start characteristic of the engine 11 and reduce exhaust emissions at the automatic-start time.

As described above, right after an automatic stop of the engine 11, first of all, the valve lift quantities of the intake valve 28 and the exhaust valve 29 are each set at a valve lift quantity presumed to be suitable for a next automatic start. Then, right before the automatic start of the engine 11, the valve lift quantities of the intake valve 28 and the exhaust valve 29 are each corrected to a valve lift quantity optimum for the automatic start. Thus, when the engine 11 is automatically started, the magnitudes of corrections for correcting the valve lift quantities are small so that the valve lift quantities of the intake valve 28 and the exhaust valve 29 can each be corrected to a valve lift quantity optimum for an automatic start in a short period of time. In addition, even if the valve lift quantities each set during the automatic stop of the engine 11 at a valve lift quantity presumed to be suitable for the next automatic start inevitably deviates from a condition optimum for the next automatic start due to the fact that the state of the engine 11 and/or the state of the vehicle have greatly changed during the automatic stop of the engine 11, the valve lift quantities of the intake valve 28 and the exhaust valve 29 can each be corrected to a valve lift quantity optimum for the automatic start when the engine 11 is automatically started.

On the other hand, the time charts shown in FIG. 13 are time charts of typical control, which is executed when an engine cooling-water temperature Tw is determined to be lower than a predetermined value and the catalyst 23 is determined to have not been activated. In this case, when the automatic stop conditions are satisfied during an operation of the engine 11, the engine 11 is automatically stopped. Right after the engine 11 is automatically stopped, since the engine cooling-water temperature Tw is determined to be lower than the predetermined value and the catalyst 23 is determined to have not been activated, the target valve lift quantities VLstop of the intake valve 28 and the exhaust valve 29 for the engine automatic-stop time are set at a valve lift quantity such as 0 or a minimum value making it difficult for residual gas left in the cylinders to leak out in order to attach importance to reduction of exhaust emissions generated during the automatic stop of the engine 11. After the valve lift quantities VLstop for the intake valve 28 and the exhaust valve 29 are controlled their respective target valve lift quantities VLstop for the engine automatic-stop time, which have each been set at a valve lift quantity making it difficult for residual gas left in the cylinders to leak out, the execution of the control of the variable-valve lift mechanisms 30 and 31 is ended. In this way, during the automatic stop of the engine 11 with the catalyst 23 put in an inactivated state, the variable-valve lift mechanisms 30 and 31 are halted with the valve lift quantities of the intake valve 28 and the exhaust valve 29 set at their respective target valve lift quantities VLstop, which have each been set at a valve lift quantity making it difficult for residual gas left in the cylinders to leak out. Thus, when the catalyst 23 is still in an inactivated state, residual gas left in the cylinders can be prevented from leaking out during the automatic stop of the engine 11 so that it is possible to reduce exhaust emissions generated during the automatic stop of the engine 11.

When the automatic start conditions are satisfied during the automatic stop of the engine 11, target valve lift quantities VLstart of the intake valve 28 and the exhaust valve 29 for the engine automatic-start time are each set at a valve lift quantity presumed to be optimum for the automatic start on the basis of an engine-cooling-water temperature Tw detected immediately before the automatic start and on the basis of other information. Then, after the valve lift quantities of the intake valve 28 and the exhaust valve 29 are corrected from their respective target valve lift quantities VLstop for the engine automatic-stop time to their respective target valve lift quantities VLstart for the engine automatic-start time, the engine 11 is automatically started. The target valve lift quantities VLstop for the engine automatic-stop time are each a valve lift quantity presumed to be suitable for an automatic start. On the other hand, the target valve lift quantities VLstart for the engine automatic-start time are each a valve lift quantity optimum for the automatic start. In this way, at an automatic-start time of the engine 11, the engine 11 can be automatically started at a valve lift quantity suitable for the automatic start. When the catalyst 23 is still in an inactivated state, it is thus possible to improve the automatic-start characteristic of the engine 11 while reducing exhaust emissions at the automatic-start time.

The time charts shown in FIG. 14 are time charts of typical control executed in the event of an engine stall caused by a failure of an automatic start of the engine 11. In this case, in the event of an engine stall, the target valve lift quantity VLstart set for the intake valve 28 to be used at an automatic-start time of the engine 11 is increased by a predetermined valve lift quantity increment ΔVL in a correction process to increase the intake airflow. Then, after correcting the target valve lift quantity VLstart for the automatic-start time of the engine 11, variable-valve lift control is executed to control the variable-valve lift mechanism 30 of the intake valve 28 so that the valve lift quantity of the intake valve 28 is adjusted to the corrected target valve lift quantities VLstart. At a point of time the valve lift quantity of the intake valve 28 becomes equal to the corrected target valve lift quantity VLstart, automatic start control is re-executed to automatically start the engine 11.

Thus, even in the event of an engine stall caused by a failure of an automatic start of the engine 11, at an automatic restart time, automatic start control of the engine 11 can be executed with a valve lift quantity corrected to a value greater than a valve lift quantity at the time of the engine stall, that is, corrected in a direction of increasing the intake airflow. As a result, the engine stall can be prevented from being generated several times consecutively, and the engine can therefore be restarted successfully at an early time.

In addition, in this embodiment, by using at least one of pieces of temperature information for determining a temperature of the engine 11 or the battery and pieces of information for determining performance of the battery, a target valve lift quantity VLstop for an engine automatic-stop time and a target valve lift quantity VLstart for an engine automatic-start time are found. The pieces of temperature information include the temperature of the engine cooling water, the temperature of intake air, the ambient temperature and the temperature of the oil while the pieces of information for determining performance of the battery include the number of engine automatic stops carried out so far or the number of engine automatic starts carried out so far. As described above, the target valve lift quantity VLstop for an engine automatic-stop time is a valve lift quantity presumed to be suitable for the next automatic start. Thus, in order to cope with the fact that the performance of the battery is poor at a low temperature of the battery, decreasing the driving power of the starter, causing greater frictions among movable parts and, hence, making the cranking of the automatic-start time of the engine 11 prone to variations, the target valve lift quantity is corrected in a direction of stabilizing the cranking such as a direction of increasing the intake airflow at the automatic-start time of the engine 11.

As described above, in this embodiment, the target valve lift quantity VLstop for an engine automatic-stop time is changed from a valve lift quantity presumed to be suitable for the next automatic start to a valve lift quantity making it difficult for residual gas left in the cylinders to leak out and vice versa in dependence on an activation state of the catalyst 23 or a temperature of the engine cooling-water. It is to be noted, however, that the target valve lift quantity VLstop for an engine automatic-stop time can also be fixed at a valve lift quantity presumed to be suitable for the next automatic start or a valve lift quantity making it difficult for residual gas left in the cylinders to leak out.

In addition, this embodiment executes both the control to adjust the valve lift quantity to the target valve lift quantity VLstop for an engine automatic-stop time in an automatic stop of the engine 11 and the control to adjust the valve lift quantity to the target valve lift quantity VLstart for an engine automatic-start time in an automatic start of the engine 11. However, only one of them can also be executed.

Furthermore, this embodiment uses a stepping motor as a means for driving the variable-valve lift mechanisms 30 and 31. However, as the means for driving the variable-valve lift mechanisms 30 and 31, a means other than the stepping motor can also be employed. Examples of the other means are an electromagnetic actuator and an oil-pressure actuator. As an alternative, by directly driving the intake valve and/or the exhaust valve by using an electromagnetic actuator, valve operation characteristics can be changed. The valve operation characteristics include the valve lift quantity and the valve timing.

Moreover, while this embodiment applies the present invention to a system for changing the operation characteristics of the intake valve and the exhaust valve, this embodiment may also apply the present invention to a system for changing the operation characteristics of the intake valve only.

Second Embodiment

Figure 15:
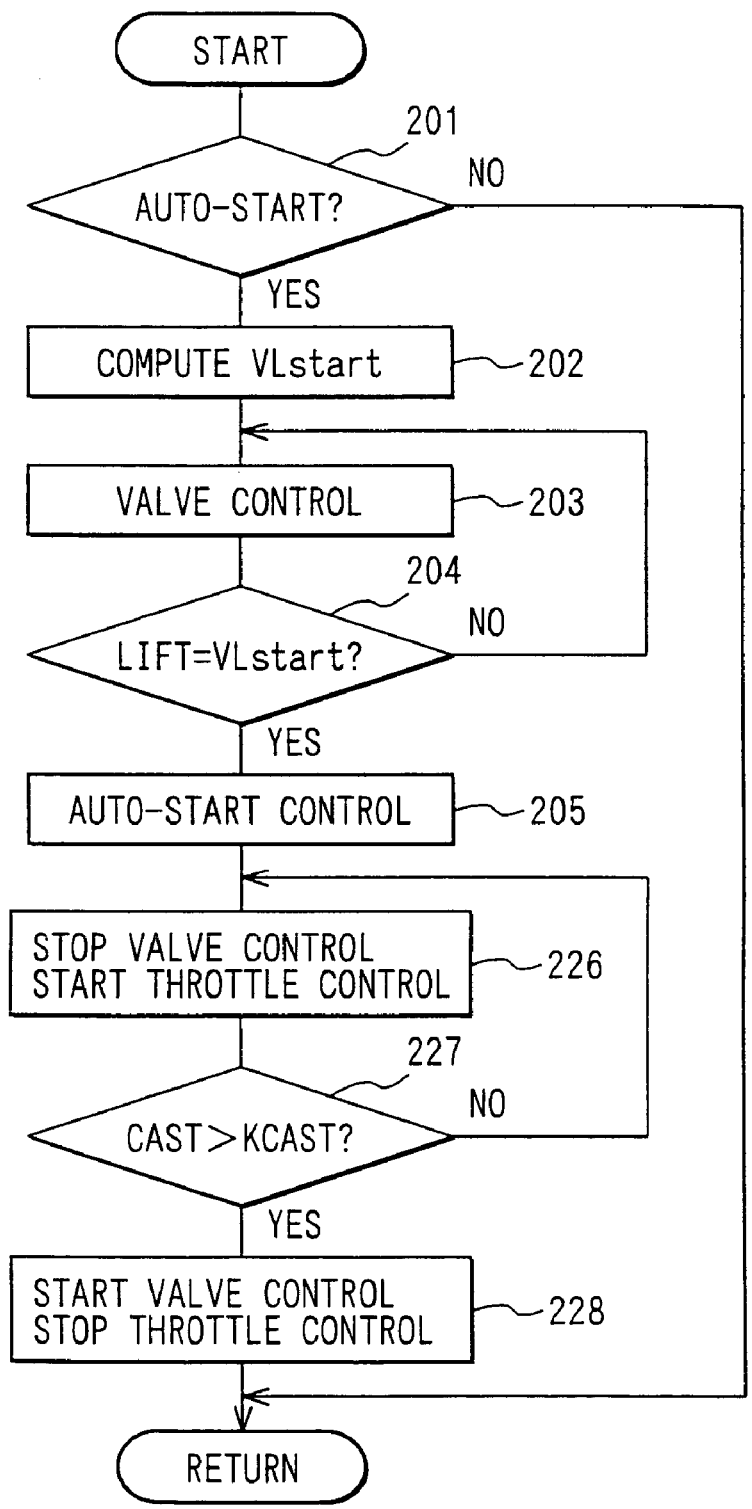
FIG. 15 is a flowchart representing engine control according to a second embodiment of the present invention.

Next, a second embodiment of the present invention is explained. The second embodiment has the same configuration as that shown in FIG. 1. In the case of the second embodiment, however, processing represented by a flowchart shown in FIG. 15 is carried out as a substitute for the first embodiment's processing represented by the flowchart shown in FIG. 8. The other control processing of the first embodiment is also carried out by the second embodiment.

Figure 17:
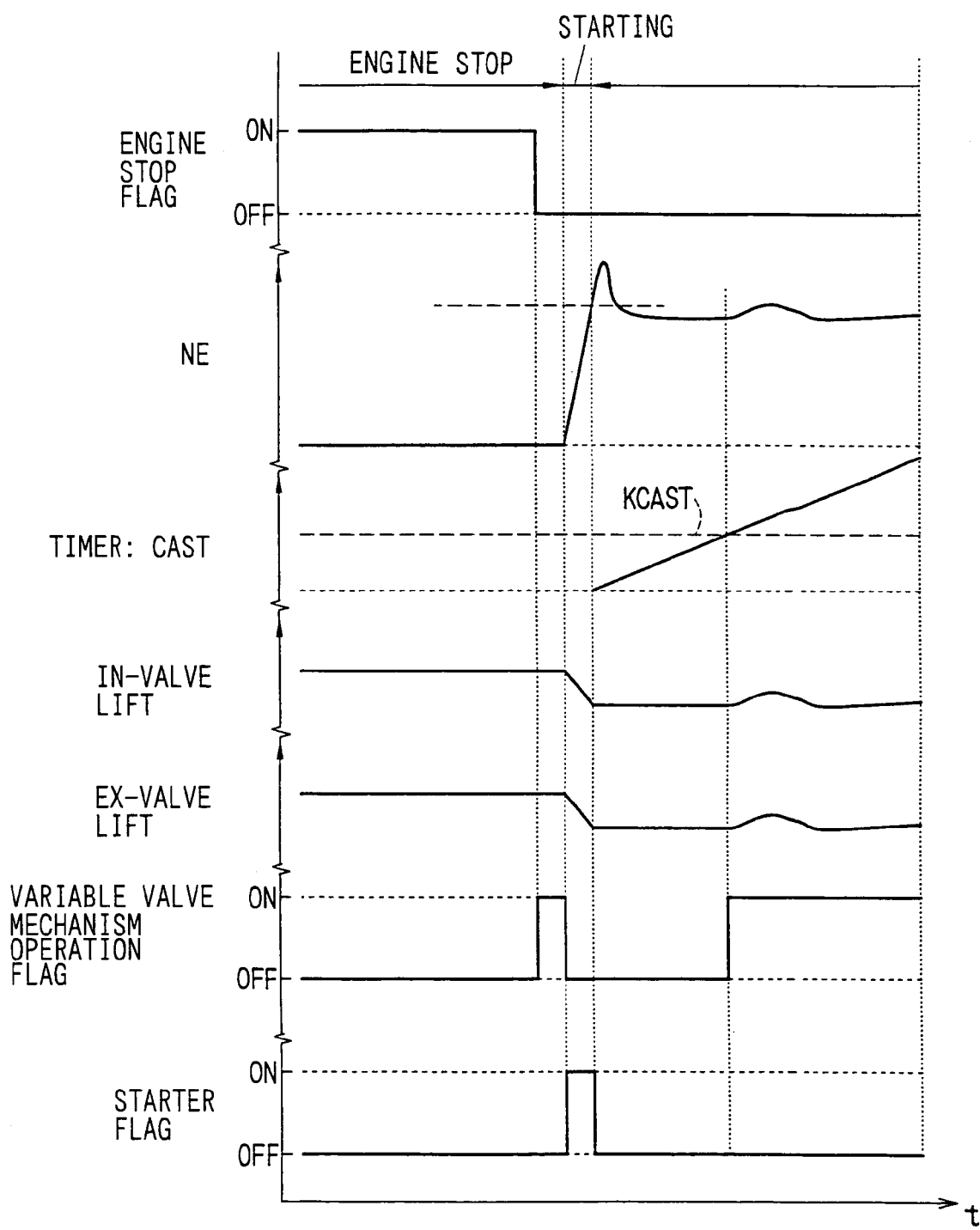
FIG. 17 is a time chart representing the engine control according to the second embodiment of the present invention.

An automatic-start control program stored in a ROM and represented by the flowchart shown in FIG. 15 is executed by the ECU 27 to automatically start the engine 11 when predetermined automatic-start conditions are satisfied in an automatic-stop state of the engine 11 with a timing shown in time charts of FIG. 17. Then, till the time lapsing since the completion of the automatic start of the engine 11 exceeds a variable-valve control prohibition time KCAST, the valve lift quantities of the intake valve 28 and the exhaust valve 29 are fixed at their respective target valve quantities for the automatic-start time, and the control of the intake airflow based on the intake the variable-valve lift control is prohibited. Instead, the intake airflow is controlled by adjusting the opening of the throttle valve 15 in the mean time.

The following description explains processing carried out by the ECU 27 by execution of the automatic-start control program represented by the flowchart shown in FIG. 15. The automatic-start control program represented by the flowchart shown in FIG. 15 is executed repeatedly at predetermined time intervals during an automatic stop of the engine 11. The processing carried out at the steps 201 to 205 is the same as that carried out at the steps 201 to 205 of the first embodiment.

After completion of the step 203, the flow of the program goes on to a step 204 to determine whether or not the valve lift quantities of the intake valve 28 and the exhaust valve 29 have been adjusted to their respective target valve lift quantities VLstart. At a point of time the valve lift quantities of the intake valve 28 and the exhaust valve 29 become equal to their respective target valve lift quantities VLstart, the flow of the program goes on to a step 205 at which automatic start control is executed to turn on the starter and to start the engine 11 automatically. The processing of the step 205 is carried out to play the role of an automatic-start control means.

At the next step 226, the valve lift quantities of the intake valve 28 and the exhaust valve 29 are fixed at their respective target valve quantities for the automatic-start time after completion of the automatic start of the engine 11. The control of the intake airflow based on the intake the variable-valve lift control is prohibited. Instead, throttle-valve control is started to control the intake airflow by adjusting the opening of the throttle valve 15.

Figure 16:
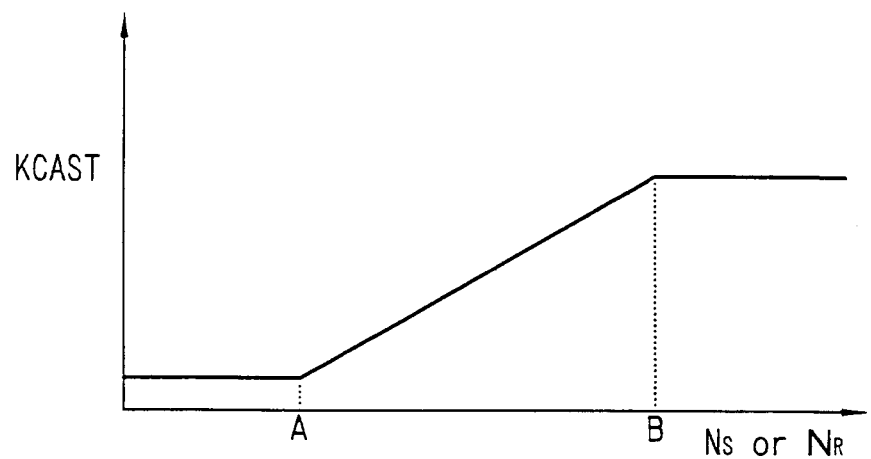
FIG. 16 is a graph representing a relation between the engine-automatic-stop count NS or the engine-automatic-start count NR and a prohibition time KCAST of variable-valve control in the second embodiment of the present invention.

The flow of the program goes on to a step 227 to determine whether or not the time CAST lapsing since the completion of the automatic start of the engine 11 has exceeded the variable-valve control prohibition time KCAST. The variable-valve control prohibition time KCAST is set at a period of time it takes to stabilize the operating state to a certain degree. The time required to stabilize the operating state is a period of time lapsing since the completion of the automatic start of the engine 11. This period includes complicated and much variable transient times. In this case, in order to make the processing simple, the variable-valve control prohibition time KCAST can be set at a fixed value determined in advance. As an alternative, a variable-valve control prohibition time KCAST can be determined by searching the variable-valve control prohibition time KCAST's map like one shown in FIG. 16 for a particular value dependent on the number of automatic stops carried out so far since the start of the running state of the vehicle (that is, an automatic stop count NS) or the number of automatic starts carried out so far since the start of the running state of the vehicle (that is, an automatic start count NR). That is, the variable-valve control prohibition time KCAST is set at the particular value.

The larger the automatic stop count NS or the automatic start count NR, the more frequently adverse effects such as deterioration of the drivability and deterioration of exhaust emissions are experienced. Such deteriorations are caused by the variable-valve lift control. In accordance with the map shown in FIG. 16, the larger the automatic stop count NS or the automatic start count NR, the larger the value at which the variable-valve control prohibition time KCAST is set. Thus, the number of adverse effects caused by the variable-valve lift control can be reduced. It is to be noted that, in accordance with the typical map shown in FIG. 16, in a zone where the automatic stop count NS or the automatic start count NR is smaller than a predetermined value A, the variable-valve control prohibition time KCAST is set at a fixed value, which is a lower limit. In a zone where the automatic stop count NS or the automatic start count NR is greater than another predetermined value B, on the other hand, the variable-valve control prohibition time KCAST is set at another fixed value, which is an upper limit.

If the determination result obtained at the step 227 indicates that the time CAST lapsing since the completion of the automatic start of the engine 11 has not exceeded the variable-valve control prohibition time KCAST, the flow of the program goes back to the step 226. The processing of the steps 226 and 227 is carried out to play the roles of a variable-valve control prohibition means and a throttle-valve control means.

At a point of time the determination result obtained at the step 227 indicates that the time CAST lapsing since the completion of the automatic start of the engine 11 has exceeded the variable-valve control prohibition time KCAST, the flow of the program goes back to the step 228 at which the variable-valve control is permitted and the throttle-valve control is ended. In consequence, after the time CAST lapsing since the completion of the automatic start of the engine 11 exceeds the variable-valve control prohibition time KCAST, the valve lift quantities of the intake valve 28 and the exhaust valve 29 are continuously changed in accordance with information such as an accelerator position and an operating state of the engine 11 in order to control the intake airflow. In the course of the intake-air-flow control based on the control of the variable-valve lift quantities, the throttle valve 15 is fixed typically at a completely opened position to reduce the resistance of intake air.

It is to be noted that, in a system employing a variable valve timing mechanism in conjunction with the variable-valve lift mechanisms 30 and 31, before the time CAST lapsing since the completion of the automatic start of the engine 11 exceeds the variable-valve control prohibition time KCAST, the valve lift quantities can be fixed at their respective target valve lift quantities for the automatic-start time of the engine 11 and the valve timings can be fixed at their respective target valve timings for the automatic-start time of the engine 11.

In the case of the embodiment described above, before the time CAST lapsing since the completion of the automatic start of the engine 11 exceeds the variable-valve control prohibition time KCAST, the valve lift quantities of the intake valve 28 and the exhaust valve 29 are fixed and the intake-air-flow control based on the control of the variable-valve lift quantities is prohibited. Instead, the intake airflow is controlled by adjusting the opening of the throttle valve 15. Thus, during a period including complicated and much variable transient times right after an automatic start of the engine 11, by using the conventional system, the field-proven throttle-valve control can be executed as the control of the intake airflow in order to adjust the intake airflow in a stable manner. As a result, after the automatic start of the engine 11, deterioration of the drivability and deterioration of exhaust emissions can be avoided.

In addition, in the case of this embodiment, after completion of an automatic start of the engine 11, the valve lift quantities of the intake valve 28 and the exhaust valve 29 are fixed at their respective target valve lift quantities for the automatic-start time of the engine 11 or for a time prior to the completion of the automatic start of the engine 11. Thus, before and after the completion of the automatic start of the engine 11, the valve lift quantities can each be sustained at a fixed value to eliminate variations in valve lift quantities. As a result, a torque shock and/or deterioration of exhaust emissions can be prevented from occurring due to changes in valve lift quantities.

It is to be noted that the fixed values at which the valve lift quantities are sustained after the automatic start of the engine 11 do not have to be the target valve lift quantities for the automatic-start time of the engine 11. Instead, the fixed values at which the valve lift quantities are sustained after the automatic start of the engine 11 can be each a constant determined in advance or found by using a map, a formula or the like in dependence on operating states for the automatic-start time of the engine 11, which include a temperature of the cooling water, a temperature of the oil, an ambient temperature and an automatic halt period of the engine 11.

In addition, in the case of this embodiment, a map used for finding a variable-valve control prohibition time KCAST is created in such a way that, the larger the automatic stop count NS or the automatic start count NR, the larger the value at which the variable-valve control prohibition time KCAST is set. After the start of a running state of the vehicle, the automatic stop count NS or the automatic start count NR is small so that adverse effects such as deterioration of exhaust emissions and deterioration of the drivability, which are caused by the variable-valve lift control, are experienced less frequently. Thus, after the start of a running state of the vehicle, the variable-valve control prohibition time KCAST is set at a small value so as to start the variable-valve lift control from an early time after an automatic start of the engine 11. By starting the variable-valve lift control from an early time, it is possible to let the improvement of the performance such as improvement of the fuel economy resulting from the variable-valve lift control take precedence of others. Then, as the automatic stop count NS or the automatic start count NR increases after the start of a running state of the vehicle so that the adverse effects caused by the variable-valve lift control are experienced more frequently, the variable-valve control prohibition time KCAST is set at a large value so as to let avoidance of the adverse effects caused by the variable-valve lift control take precedence of the improvement of the performance by execution the variable-valve lift control.

As described above, this embodiment uses a stepping motor as a means for driving the variable-valve lift mechanisms 30 and 31. It is to be noted, however, that, as the means for driving the variable-valve lift mechanisms 30 and 31, a means other than the stepping motor can also be employed. Examples of the other means are an electromagnetic actuator and an oil-pressure actuator. As an alternative, by directly driving the intake valve and/or the exhaust valve by using an electromagnetic actuator, valve operation characteristics can be changed. The valve operation characteristics include the valve lift quantity and the valve timing.

In addition, while this embodiment applies the present invention to a system for changing the operation characteristics of the intake valve and the exhaust valve, this embodiment may also apply the present invention to a system for changing the operation characteristics of the intake valve only.

Third Embodiment

Figure 18:
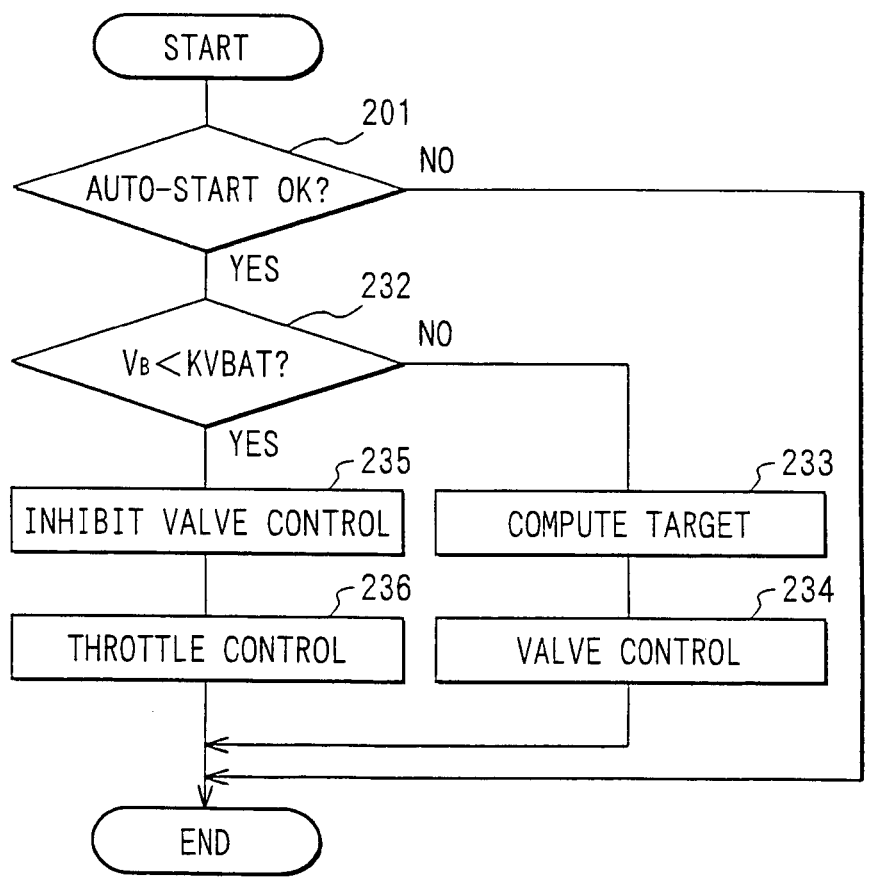
FIG. 18 is a flowchart representing engine control according to a third embodiment of the present invention.

Next, a third embodiment of the present invention is explained. The third embodiment has the same configuration as that shown in FIG. 1. In the case of the third embodiment, however, processing represented by a flowchart shown in FIG. 18 is carried out as a substitute for the first embodiment's processing represented by the flowchart shown in FIG. 8. The other control processing of the first embodiment is also carried out by the third embodiment.

An automatic-start control program stored in a ROM and represented by the flowchart shown in FIG. 18 is executed by the ECU 27 to automatically start the engine 11 when predetermined automatic-start conditions are satisfied in an automatic-stop state of the engine 11. It is to be noted that, at that time, the variable-valve lift mechanisms 30 and 31 are each set at a position proper for a restart operation.

The ECU 27 executes the automatic-start control program represented by the flowchart shown in FIG. 18 to accompany an automatic stop of the engine 11. The automatic-start control program represented by the flowchart shown in FIG. 18 is executed repeatedly at predetermined time intervals based on a count value of typically a counter not shown in the figure. When the program is invoked, the flowchart begins with a step 201 to determine whether or not the automatic-start conditions are satisfied.

If a determination result obtained at the step 201 is an acknowledgement, the flow of the program goes on to a step 232. At the step 232, the voltage VB of the battery 41-mounted on the vehicle is compared with a voltage criterion value KVBAT.

The voltage criterion value KVBAT is a value set for the following reason. If the voltage VB of the battery 41 is low so that a voltage applied to a stepping motor for rotating the control shaft 35 is not sufficient, the responsiveness of the stepping motor deteriorates even if valve lift control is executed on the basis of, among others, an operating state. If the responsiveness of the stepping motor deteriorates, the rotation of the control shaft 35 is inevitably late, being incapable of following a target valve lift quantity. Thus, a target intake airflow cannot be obtained. As a result, exhaust emissions unavoidably worsen. For this reason, the voltage criterion value KVBAT is set at a value to be used as a criterion for determining whether or not the problem described above arises.

If a comparison result obtained at the step 232 indicates that the voltage VB of the battery 41 is equal to or higher than the voltage criterion value KVBAT, the flow of the program goes on to a step 234 by way of a step 233. The processing of these steps is carried out to execute variable-valve lift quantity control right after the restart of the engine 11. The variable-valve lift quantity control can be executed right after the restart of the engine 11 because the voltage VB of the battery 41 is sufficiently high. Specifically, first of all, target positions of the intake and exhaust valves 28 and 29 are found at the step 233. The target positions of the intake and exhaust valves 28 and 29 are target valve lift positions of the intake and exhaust valves 28 and 29 for the restart time of the engine 11. The target positions of the intake and exhaust valves 28 and 29 are found by using typically a map or a formula in dependence on operating states for the restart time of the engine 11. The operating states include a temperature of the cooling water, a temperature of the oil, an ambient temperature and a stop period of the engine 11.

After the target positions of the intake and exhaust valves 28 and 29 are found, the variable-valve lift quantity control is executed at the step 234. Specifically, the variable-valve lift mechanism 30 of the intake valve 28 and the variable-valve lift mechanism 31 of the exhaust valve 29 are controlled so that the valve lift positions of the intake and exhaust valves 28 and 29 are brought to the target positions of the intake and exhaust valves 28 and 29 for the restart time of the engine 11 before the execution of the program is ended.

If the comparison result obtained at the step 232 indicates that the voltage VB of the battery 41 is lower than the voltage criterion value KVBAT, on the other hand, the flow of the program goes on to a step 236 by way of a step 235. At the step 235, the variable-valve lift quantity control is prohibited before the flow of the program goes on to the step 236. At the step 236, a target intake airflow is found by using typically a map or a formula in dependence on operating states for the restart time of the engine 11. The operating states include a temperature of the cooling water, a temperature of the oil, an ambient temperature and a stop period of the engine 11. Then, control is executed to drive the throttle valve 15 so that the intake airflow into a combustion chamber is brought to the target intake airflow.

As described above, if the voltage VB of the battery 41 is lower than the voltage criterion value KVBAT, the intake airflow control by using the intake valve 28 is prohibited. Instead, control by using the throttle valve 15 is executed.

Figure 19:
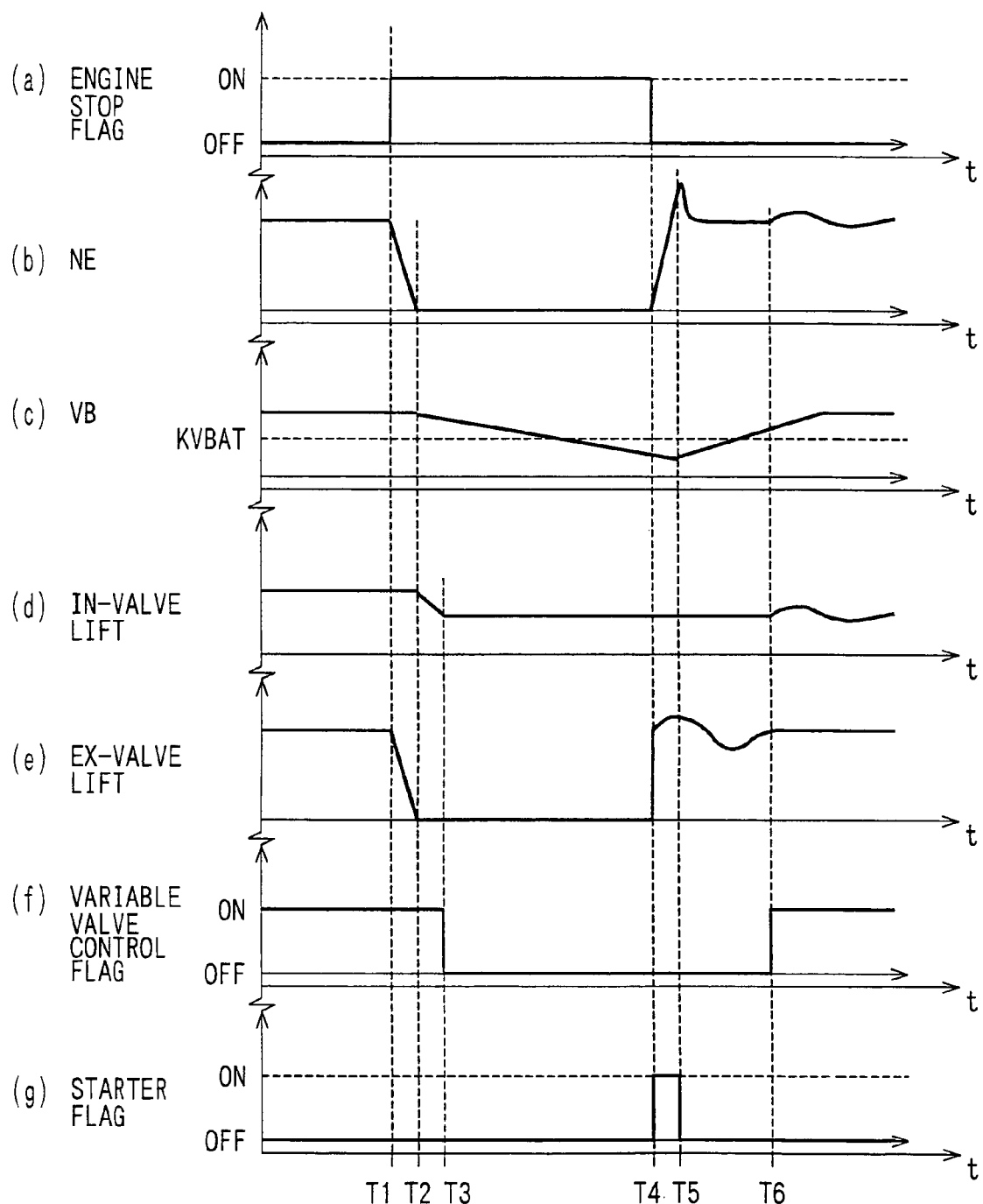
FIG. 19 is a time chart representing the engine control according to the third embodiment of the present invention.

Next, typical operations of the embodiment are explained by referring to time charts shown in FIG. 19. An idle stop execution flag shown in a column (a) in FIG. 19 is a flag indicating an automatic stop operation or a restart operation of the engine 11. First of all, at a time T1, the idle stop execution flag is turned on and the engine 11 is automatically stopped by halting operations such as the fuel injection control and the ignition control. The engine speed NE decreases to 0 rpm at a time T2 as shown in a column (b) in FIG. 19. At the time T1, the opening of the throttle valve 15 is restored to a completely closed position as shown in a column (d) in FIG. 19.

At the time T2, when the engine 11 is stopped as evidenced by an engine speed NE of 0 rpm, the variable-valve lift mechanism 30 is set to take the lift quantity of the intake valve 28 to a lift quantity suitable for a restart of the engine 11 as shown in a column (d) in FIG. 19. Then, at a time T3, when the lift quantity of the intake valve 28 is set at a position suitable for a restart of the engine 11, a variable-valve lift quantity control execution flag is set at an OFF state as shown in a column (f) in FIG. 19.

Then, at a time T4, the engine 11 is automatically started at a request made by the driver. For example, when a starter flag is turned on as shown in a column (g) in FIG. 19, the idle stop execution flag shown in the column (a) in FIG. 19 is turned off to commence the restart operation of the engine 11. In the case of this embodiment, if the voltage VB of the battery 41 is lower than the voltage criterion value KVBAT as shown in a column (c) in FIG. 19, the variable-valve lift quantity control of the intake valve 28 is prohibited and the intake airflow control is executed by using the throttle valve 15 as shown in a column (e) in FIG. 19. Then, as the voltage VB of the battery 41 exceeds the voltage criterion value KVBAT at a time T6, the throttle valve 15 is fixed at a predetermined opening and the variable-valve lift quantity control of the intake valve 28 is executed. In this way, it is possible to implement intake airflow control with good responsiveness.

As described above, if the voltage VB of the battery 41 is lower than the voltage criterion value KVBAT, the variable-valve lift quantity control of the intake valve 28 is prohibited to inhibit the execution of the intake airflow control based on the variable-valve lift quantity control. Thus, even if the precision of the variable-valve lift quantity control becomes poor due to a low voltage VB of the battery 41, deteriorations of exhaust emissions can be suppressed because the variable-valve lift mechanisms 30 and 31 are fixed.

Fourth Embodiment

Figure 20:
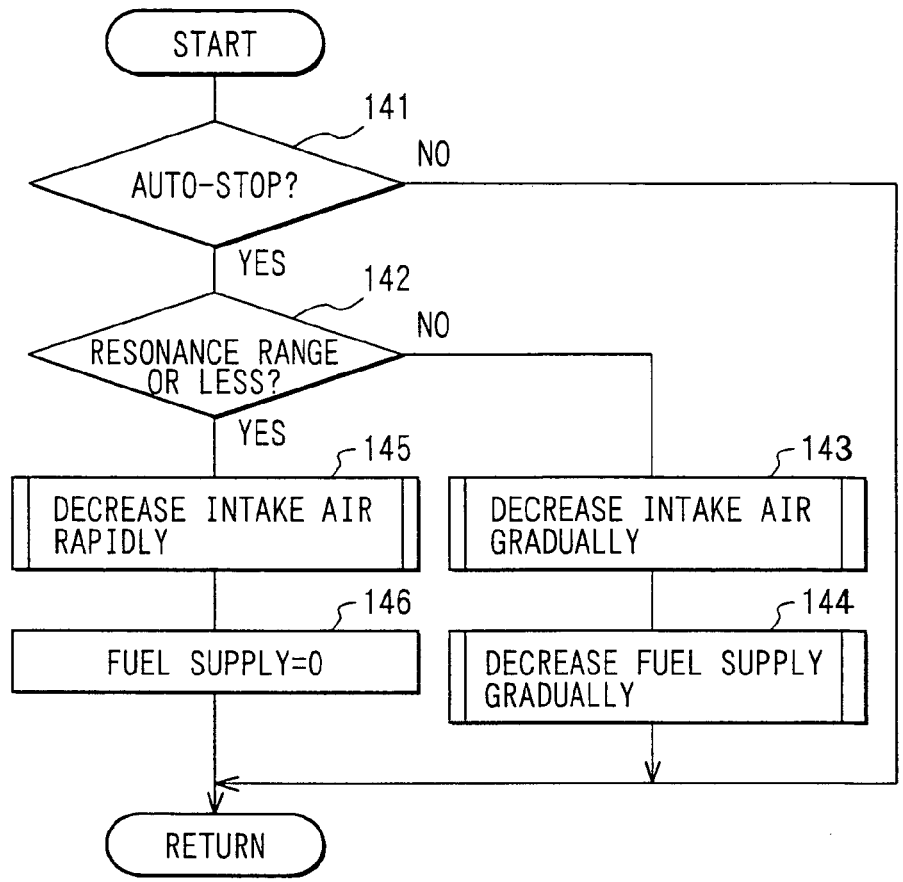
FIG. 20 is a flowchart representing engine control according to a fourth embodiment of the present invention.

Next, a fourth embodiment of the present invention is explained. The fourth embodiment has the same configuration as that shown in FIG. 1. In the case of the fourth embodiment, however, processing represented by a flowchart shown in FIG. 20 is carried out as a substitute for the first embodiment's processing represented by the flowchart shown in FIG. 6. The other control processing of the first embodiment is also carried out by the fourth embodiment.

Figure 26:
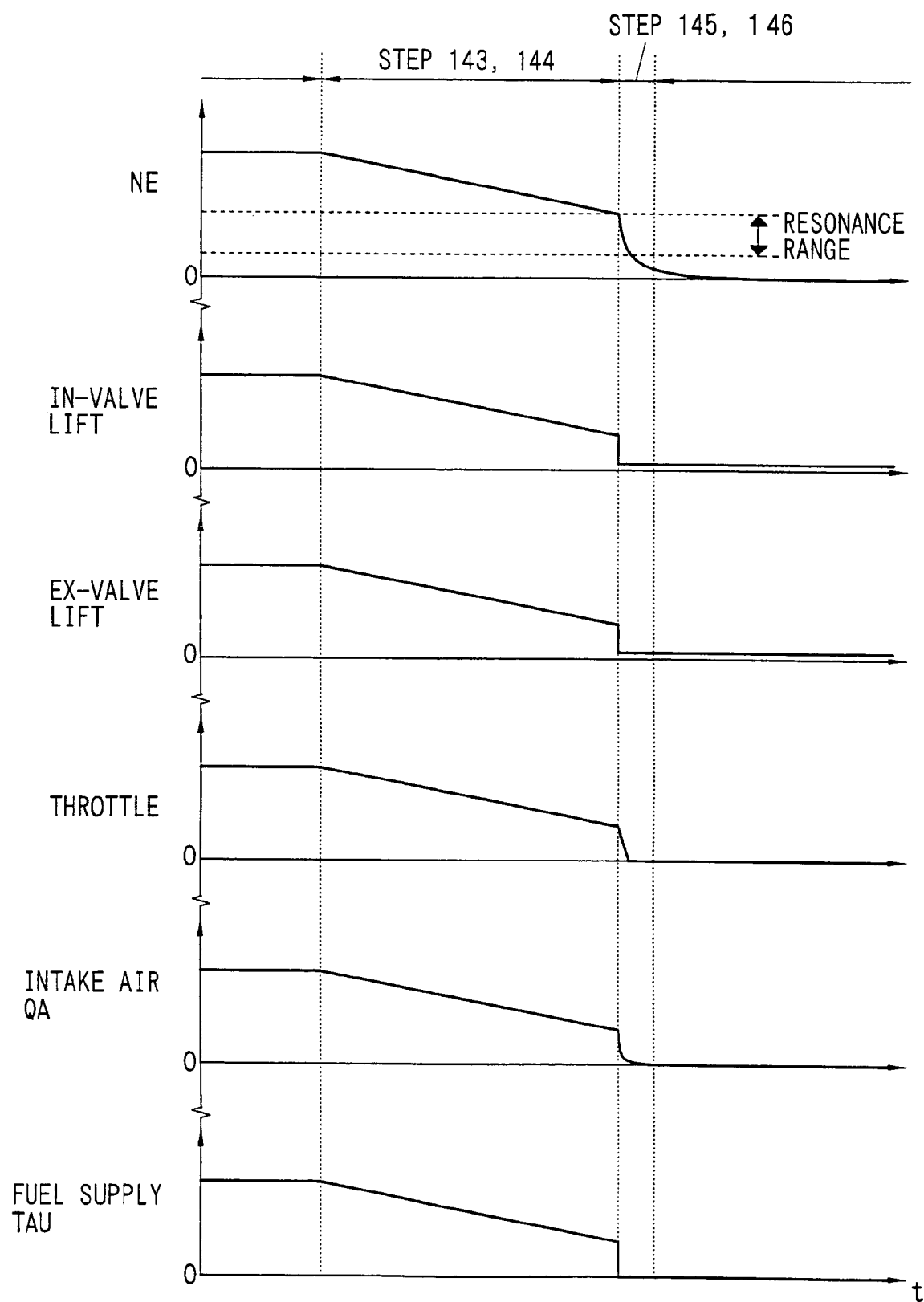
FIG. 26 is a time chart representing engine control according to the fourth embodiment of the present invention.
Figure 27:
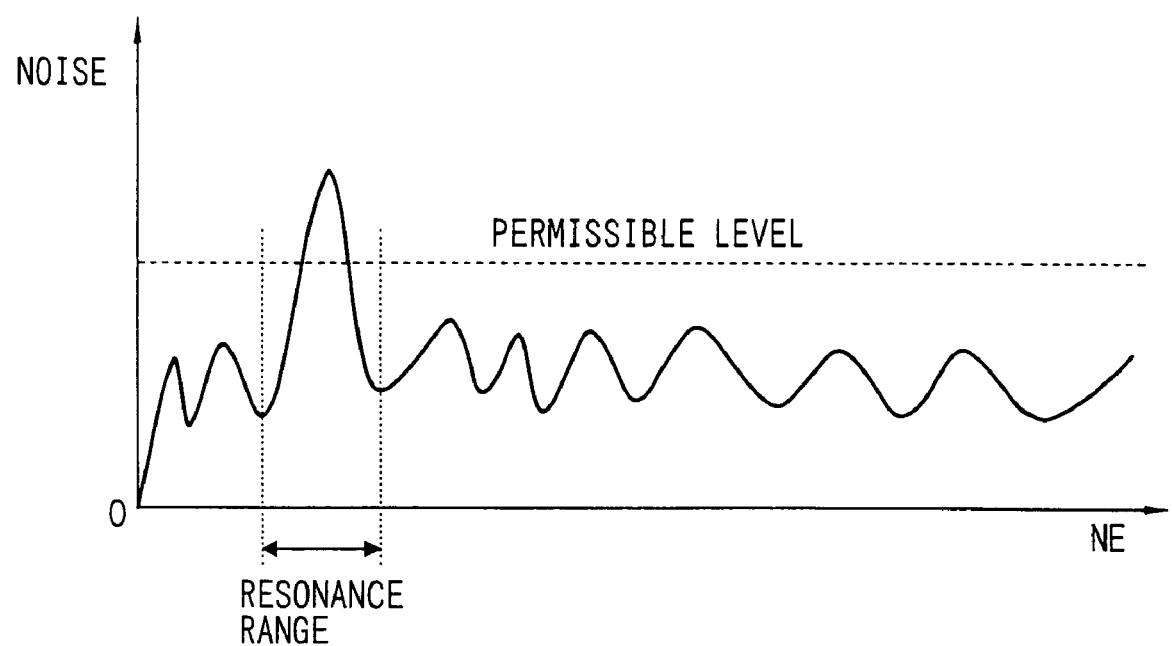
FIG. 27 is a graph representing a relation between an engine speed NE and the magnitude of a noise in the fourth embodiment of the present invention.

The ECU 27 executes automatic stop control programs shown in FIGS. 20, 21, 24 and 25. In an operation to automatically stop the engine 11, the engine speed NE is gradually reduced as shown in time charts of FIG. 26 in order to give no sense of incompatibility to the driver. In order to gradually reduce the engine speed NE, it is necessary to gradually decrease a torque output by the engine 11. In order to gradually decrease the torque output by the engine 11, it is necessary to gradually reduce the input airflow QA and the fuel injection volume TAU as shown in the same flowcharts. When the engine speed NE is decreased to a resonant revolution speed zone, torque abrupt reduction control is executed to abruptly decrease the torque output by the engine 11. The torque abrupt reduction control is executed by abruptly reducing the input airflow QA and ending the injection of fuel by adjustment of the variable-valve mechanism 30 and the throttle valve 15. By executing the torque abrupt reduction control at the time the engine speed NE is decreased to the resonant revolution speed zone, the engine speed NE can pass through the resonant revolution speed zone in a short period of time. The resonant revolution speed zone is the engine speed NE's zone in which the vibration of the engine 11 is resonant with the vibration of the vehicle-driving system. The resonant revolution speed zone is typically the revolution speed range 300 to 400 rpm. FIG. 27 shows a graph representing a relation between the engine speed NE and the magnitude of a noise.

The following description explains processing carried out by the ECU 27 by execution of the programs.

Automatic Stop Control

The automatic stop control program represented by the flowchart shown in FIG. 20 is executed repeatedly at predetermined intervals after a request for a stop of the engine 11 is made when predetermined automatic stop control conditions are satisfied during an operation of the engine 11. The program is executed to play the role of an automatic stop control means. When the program is invoked, the flowchart begins with a step 141 to determine whether or not the engine 11 is in a state prior to an automatic stop process of the engine 11 or prior to completion of the an automatic stop process of the engine 11 by typically determining whether or not the engine speed NE is higher than a criterion value for the completion of the automatic stop. If the engine 11 is in an automatic stop process of the engine 11, the flow of the program goes on to a step 142 to determine whether or not the engine speed NE is in the resonant revolution speed zone or even lower than the zone. A criterion range used in the determination of the step 142 can be made greater than the resonant revolution speed zone to a certain degree in order to provide a small margin to the determination. In a word, the criterion range needs to include a resonant revolution speed, which increases the amplitude of vibration of the engine 11, the amplitude of vibration of the vehicle-driving system and the magnitude of a noise when the frequency of the vibration of the engine 11 matches the characteristic frequency of the vibration of the vehicle-driving system.

Figure 21:
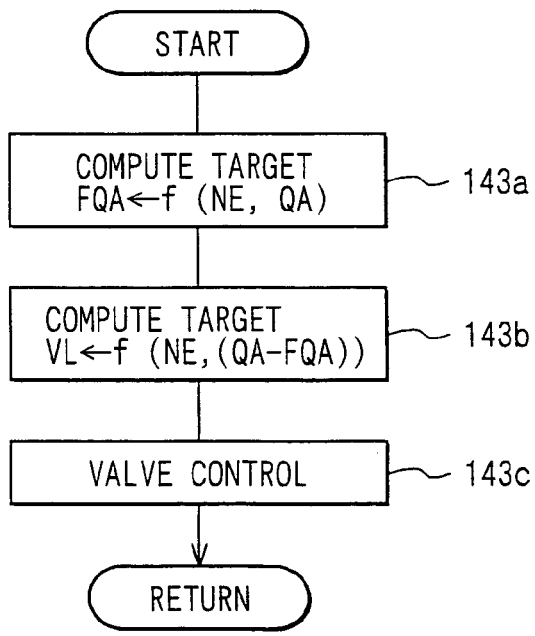
FIG. 21 is a flowchart representing other engine control according to the fourth embodiment of the present invention.
Figure 24:
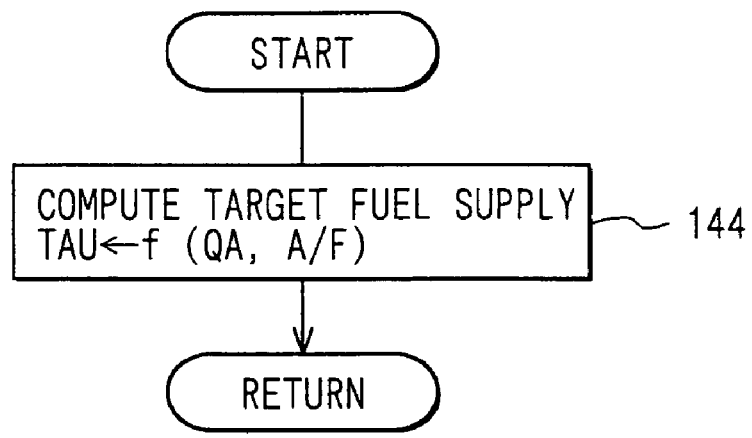
FIG. 24 is a flowchart representing further engine control according to the fourth embodiment of the present invention.

If a determination result obtained at the step 142 indicates that the engine speed NE has not decreased to a value in the resonant revolution speed zone, torque gradual reduction control is executed at steps 143 and 144. The torque gradual reduction control begins with the step 143 at which an intake airflow gradual reduction control program represented by the flowchart shown in FIG. 21 is executed to gradually reduce the intake airflow QA. Then, at the next step 144, a fuel injection volume gradual reduction control program represented by the flowchart shown in FIG. 24 is executed to gradually reduce the fuel injection volume TAU. In this way, the torque output by the engine 11 can be gradually decreased to gradually reduce the engine speed NE without providing a sense of incompatibility to the driver.

Figure 25:
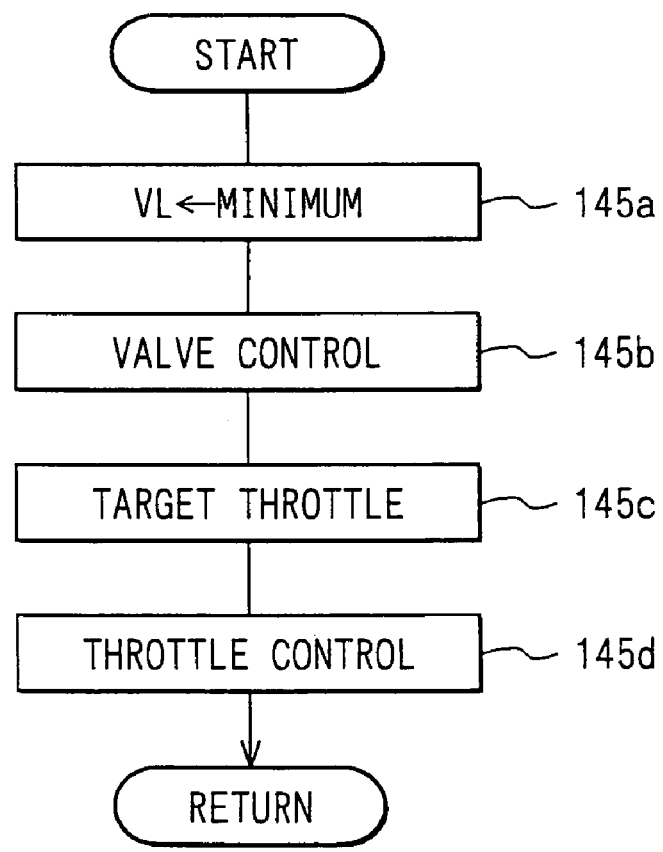
FIG. 25 is a flowchart representing still further engine control according to the fourth embodiment of the present invention.

If a determination result obtained at the step 142 in a later execution of the automatic stop control program represented by the flowchart shown in FIG. 20 indicates that the engine speed NE has decreased to a value in the resonant revolution speed zone or a value lower than the zone, on the other hand, torque abrupt reduction control is executed at steps 145 and 146. The torque abrupt reduction control begins with the step 145 at which an intake airflow abrupt reduction control program represented by the flowchart shown in FIG. 25 is executed to abruptly reduce the intake airflow QA. Then, at the next step 146, injection of fuel is ended. In this way, the torque output by the engine 11 can be abruptly decreased to abruptly reduce the engine speed NE so that the engine speed NE can pass through resonant revolution speed zone in a short period of time.

Intake Airflow Gradual Reduction Control

Figure 22:
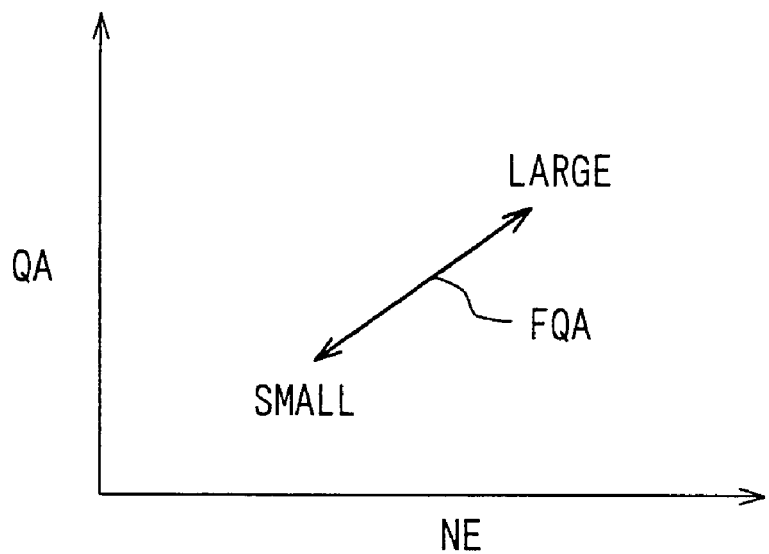
FIG. 22 is a map for setting a target intake airflow excess reduction quantity FQA in the fourth embodiment of the present invention.

When the intake airflow gradual reduction control program represented by the flowchart shown in FIG. 21 is invoked at the step 143 of the flowchart shown in FIG. 20, the flowchart shown in FIG. 21 begins with a step 143a at which a target intake airflow gradual reduction quantity FQA is found for the present engine speed NE and the present intake airflow QA by using a formula or a map prepared for the target intake airflow gradual reduction quantity FQA as shown in FIG. 22. The map of target intake airflow gradual reduction quantity FQA shown in FIG. 22 is created so that, the lower the engine speed NE, the smaller the target intake airflow gradual reduction quantity FQA and, the smaller the intake airflow QA, the smaller the target intake airflow gradual reduction quantity FQA.

Figure 23:
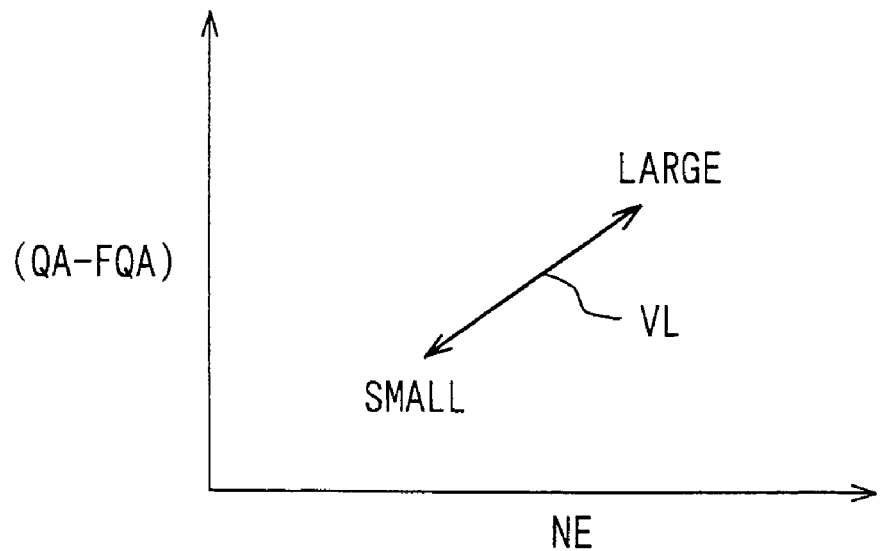
FIG. 23 is a map for setting a target lift quantity VL in the fourth embodiment of the present invention.

After a target intake airflow gradual reduction quantity FQA is found, the flow of the program goes on to a step 143b at which a target valve lift quantity VL of the intake valve 28 is found for the present engine speed NE and a target intake airflow by using a formula or a map prepared for the target valve lift quantity VL of the intake valve 28 as shown in FIG. 23. The target intake airflow is a difference between the present intake airflow QA and the target intake airflow gradual reduction quantity FQA. The target valve lift quantity VL's map shown in FIG. 23 is created so that, the lower the engine speed NE, the smaller the target valve lift quantity VL and, the smaller the target intake airflow, that is, the smaller the difference between the present intake airflow QA and the target intake airflow gradual reduction quantity FQA, the smaller the target valve lift quantity VL.

After the target valve lift quantity VL is computed, the flow of the program goes on to a step 143c at which the variable-valve control is executed to control the variable-valve lift mechanism 30 of the intake valve 28 so as to take the valve lift quantity of the intake valve 28 to the target valve lift quantity VL.

It is to be noted that in a system employing a variable valve timing mechanism in conjunction with the variable-valve lift mechanism 30, at a step 202, a target valve lift quantity VL and a target valve timing VT are computed. Then, at the next step 203, the variable-valve lift mechanism 30 of the intake valve 28 is controlled so as to take the valve lift quantity of the intake valve 28 to the target valve lift quantity VL and the variable valve timing mechanism of the intake valve 28 can be controlled so as to take the variable valve timing of the intake valve 28 to the target variable valve timing VT.

By carrying the processing described above repeatedly, the variable-valve lift mechanism 30 of the intake valve 28 or both the variable-valve lift mechanism 30 and the variable valve timing mechanism of the intake valve 28 are controlled so as to gradually reduce the input airflow QA by the target intake airflow gradual reduction quantity FQA at one time.

Fuel Injection Volume Gradual Reduction Control

When the fuel injection volume gradual reduction control program shown in FIG. 24 is invoked at the step 144 of the flowchart shown in FIG. 20, a fuel injection volume TAU that takes the air-fuel ratio to a target air-fuel ratio A/F is computed by using the present intake airflow QA and the target air-fuel ratio A/F, which is typically set at the stoichiometric air-fuel ratio. Thus, when the intake airflow gradual reduction control program represented by the flowchart shown in FIG. 21 is executed to gradually reduce the intake airflow, the fuel injection volume TAU is also gradually reduced while the air-fuel ratio is being sustained at the target air-fuel ratio A/F, which is typically the stoichiometric air-fuel ratio, so that the torque output by the engine 11 and, hence, the engine speed NE are gradually reduced.

Intake Airflow Abrupt Reduction Control

When the fuel injection volume abrupt reduction control program shown in FIG. 25 is invoked at the step 145 of the flowchart shown in FIG. 20, first of all, at a step 145a, the target valve lift quantity VL of the intake valve 28 is set at a minimum value (>0). Then, at the next step 145b, the variable-valve control is executed to control the variable-valve lift mechanism 30 of the intake valve 28 so as to take the valve lift quantity of the intake valve 28 to the target valve lift quantity VL, which has been set at the minimum value.

It is to be noted that, in a system employing a variable valve timing mechanism in conjunction with the variable-valve lift mechanism 30, at a step 145a, a target valve lift quantity VL and a target valve timing VT that minimize the intake airflow QA are computed. Then, at the next step 145b, the variable-valve lift mechanism 30 of the intake valve 28 is controlled so as to take the valve lift quantity of the intake valve 28 to the target valve lift quantity VL and the variable valve timing mechanism of the intake valve 28 can be controlled so as to take the variable valve timing of the intake valve 28 to the target variable valve timing VT.

Then, the flow of the program goes on to a step 145c at which the target throttle opening of the throttle valve 15 is set at 0 to completely close the throttle valve 15. Subsequently, at the next step 145d, throttle-valve control is executed to adjust the throttle valve 15 so as to take the throttle opening to the target throttle opening of the throttle valve 15, which has been set at 0 to completely close the throttle valve 15. By carrying out the above processing, the intake airflow QA can be reduced abruptly.

In the case of the embodiment described above, in the intake air quantity control based on the variable-valve control, attention paid to the fact that the responsiveness of the intake air quantity control is improved without incurring a response delay of an air system leads to abrupt reduction of the intake airflow QA by execution of the variable-valve control at the time the engine speed NE decreases to the resonant revolution speed area in the course of an operation to automatically stop the engine 11. The air system starts from the throttle valve 15 and ends at the cylinders. Thus, with a timing of the engine speed NE decreasing to the resonant revolution speed area, the intake airflow QA into a cylinder can be decreased abruptly with good responsiveness so that the engine speed NE can also be abruptly decreased in the resonant revolution speed area. Thus, at an execution time of the automatic stop control, the engine speed NE can pass through the resonant revolution speed area in a short period of time. As a result, it is possible to reduce the amplitude of vibration and the magnitude of a noise, which are caused by the resonance phenomenon, as well as make the driver feel no sense of incompatibility.

In addition, in the case of this embodiment, at an execution time of torque abrupt reduction control, the variable-valve lift mechanism 30 is controlled to establish a valve operation characteristic minimizing the intake airflow QA, and the throttle valve 15 is completely closed. An example of the valve operation characteristic minimizing the intake airflow QA is a state in which the valve lift quantity is equal to a minimum value. Thus, both the variable-valve control and the throttle-valve control can be effectively utilized to set the intake airflow QA into a cylinder at 0 quickly and, hence, reduce the output torque abruptly. By adopting this control technique, even in a system incapable of controlling the intake valve 28 to a completely closed state, the resonant revolution speed area can be passed through in a short period of time so that it is possible to reduce the amplitude of vibration and the magnitude of a noise, which are caused by the resonance phenomenon.

Furthermore, in the case of this embodiment, injection of fuel is halted at an execution time of the torque abrupt reduction control. Thus, both the abrupt reduction of the intake airflow and the termination of the fuel injection can effectively decrease the engine speed abruptly.

Moreover, in the case of this embodiment, the fuel injection volume is adjusted so as to take the air-fuel ratio to a target air-fuel ratio A/F at an execution time of the torque gradual reduction control. Thus, at the execution time of the torque gradual reduction control, the air-fuel ratio can be sustained at the target air-fuel ratio A/F. As a result, the engine speed can be reduced gradually without deteriorating exhaust emissions.

In addition, in the case of this embodiment, the intake airflow QA is gradually decreased by execution of the variable-valve control at an execution time of the torque gradual reduction control. Thus, the intake airflow QA into a cylinder can be gradually reduced with good responsiveness at the execution time of the torque gradual reduction control in order to decrease the output torque gradually with a high degree or reliability.

It is to be noted that the torque gradual reduction control raises a small problem of a response delay incurred in the air system in comparison with the torque abrupt reduction control. Thus, the intake airflow QA can be gradually reduced by executing only the torque gradual reduction control. It is needless to say, nevertheless that, at an execution time of the torque gradual reduction control, both the variable-valve control and the throttle-valve control can be executed to reduce the intake airflow QA gradually.

Moreover, this embodiment has a configuration wherein the variable-valve lift mechanism 30 cannot be controlled to put the intake valve 28 in a completely closed state, that is, a state with a valve lift quantity of 0. In the case of a system having a variable-valve lift mechanism controllable to put the intake valve 28 in a completely closed state, however, the variable-valve lift mechanism can be controlled to put the intake valve 28 in a completely closed state, that is, a state with a valve lift quantity of 0, at an execution time of the torque abrupt reduction control. The intake airflow QA into a cylinder can be set at 0 instantaneously to abruptly reduce the engine speed at an execution time of the torque abrupt reduction control. Thus, the resonant revolution speed area can be passed through in a short period of time so that it is possible to substantially reduce the amplitude of vibration and the magnitude of a noise, which are caused by the resonance phenomenon.

It is to be noted that, in the case of this embodiment, in a small lift mode, the position of the control shaft 35 is set so as to set a point of contact with the link arm 34 at the position of the eccentric cam 36, that is, a position at a shortest distance from the axial center of the control shaft 35 as shown in FIG. 4. For this small lift mode, the curvature of the bottom surface range of the pressure cam 39, that is, the bottom surface range in contact with the roller 40, is designed into a curvature at which the pressure cam 39 does not bend the roller 40 downward. Thus, in the small lift mode, the pressure cam 39 never bends the roller 40 downward even when the cam 37 of the cam shaft 32 shifts the reciprocating cam 38 horizontally. As a result, the lift quantity of the intake valve 28 can be set at 0. In such a configuration, by setting the variable-valve lift mechanism 30 in the small lift mode when the engine speed NE passes through the resonant revolution speed area in an operation to automatically stop the engine 11, the intake airflow can be set at 0 so that the resonant revolution speed area can be passed through in a short period of time.

Furthermore, in the case of this embodiment, the throttle valve 15 is provided on the intake pipe 12. However, the throttle valve 15 can be eliminated and the intake airflow can be controlled by using only the variable-valve mechanism.

In addition, in the case of this embodiment, a stepping motor is used as a means for driving the variable-valve lift mechanism 30. However, as the means for driving the variable-valve lift mechanism 30, a means other than the stepping motor can also be employed. Examples of the other means are an electromagnetic actuator and an oil-pressure actuator. As an alternative, by directly driving the intake valve and/or the exhaust valve by using an electromagnetic actuator, valve operation characteristics can be changed. The valve operation characteristics include the valve lift quantity and the valve timing.

Moreover, while this embodiment applies the present invention to a system for changing the operation characteristics of the intake valve and the exhaust valve, this embodiment may also apply the present invention to a system for changing the operation characteristics of the intake valve only.

Furthermore, the scope of the present invention is not limited to a vehicle run by only a driving power output by the engine. Instead, the present invention can also be applied to a hybrid car run by both a driving power output by the engine and a driving power output by a driving-power source other than the engine. An example of the other driving-power source is a motor.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A control apparatus for an internal combustion engine, comprising:
   a variable-valve control means for controlling at least an intake airflow by adjusting valve operation characteristics of the intake valve, exhaust valve or both the intake and exhaust valves of the engine;

an automatic-start control means, which is used for automatically starting the engine when a predetermined automatic-start condition is satisfied in an automatic-stop state of the engine;

a variable-valve control prohibition means for fixing the valve operation characteristics at predetermined conditions during a variable-valve control prohibition period, which is a predetermined period after the automatic start of the engine carried out by the automatic-start control means; and a throttle-valve control means for controlling the intake airflow during the variable-valve control prohibition period by adjusting the opening of a throttle valve provided on an intake path of the engine.

2. A control apparatus for an internal combustion engine according to claim 1, wherein, during the variable-valve control prohibition period, the variable-valve control prohibition means fixes the valve operation characteristics each at a target valve operation characteristic for an automatic start of the engine.

3. A control apparatus for an internal combustion engine according to claim 1, wherein the variable-valve control prohibition means sets the variable-valve control prohibition period at a value dependent on the automatic-stop count or automatic-start count of the engine.

* * * * *